United States Patent
Caputa et al.

(10) Patent No.: US 8,156,895 B2
(45) Date of Patent: Apr. 17, 2012

(54) SELF CLEANING LITTER BOX

(75) Inventors: Elif Caputa, Boca Raton, FL (US);
Brooke Sloate, Keller, TX (US);
Michael John Otterman, Maumee, OH (US); Walter N. Yap, Boca Raton, FL (US)

(73) Assignee: United Pet Group, Inc., Cincinnati, OH (US)

( * ) Notice: Subject to any disclaimer, the term of this patent is extended or adjusted under 35 U.S.C. 154(b) by 856 days.

(21) Appl. No.: 11/226,163

(22) Filed: Sep. 14, 2005

(65) Prior Publication Data
US 2007/0056521 A1  Mar. 15, 2007

(51) Int. Cl.
*A01K 29/00* (2006.01)
(52) U.S. Cl. ........................................... 119/166
(58) Field of Classification Search ................. 119/161, 119/163, 166
See application file for complete search history.

(56) References Cited

U.S. PATENT DOCUMENTS

| | | | |
|---|---|---|---|
| 3,734,057 A | 5/1973 | Lee et al. | 119/1 |
| 3,811,410 A | 5/1974 | Roberts | 119/1 |
| 3,964,437 A | 6/1976 | Brown | 119/1 |
| 4,011,836 A | 3/1977 | Temel | 119/1 |
| 4,011,837 A | 3/1977 | Ksioszk | 119/1 |
| 4,050,414 A | 9/1977 | Knochel et al. | 119/1 |
| 4,096,827 A | 6/1978 | Cotter | 119/1 |
| 4,098,229 A | 7/1978 | Haynes et al. | 119/1 |
| 4,117,804 A | 10/1978 | Moore et al. | 119/1 |
| 4,120,264 A | 10/1978 | Carter | 119/1 |
| 4,190,525 A | 2/1980 | Menzel | 209/235 |
| 4,325,325 A | 4/1982 | Larter | 119/1 |
| 4,325,822 A | 4/1982 | Miller | 209/251 |
| 4,469,046 A | 9/1984 | Yananton | 119/1 |
| 4,574,735 A | 3/1986 | Hohenstein | 119/1 |
| 4,658,720 A | 4/1987 | Massonnet | 100/226 |
| 4,729,342 A | 3/1988 | Loctin | 119/1 |
| 4,844,011 A | 7/1989 | Strickland | 119/1 |
| 4,846,104 A | 7/1989 | Pierson, Jr. | 119/1 |
| 4,854,267 A | 8/1989 | Morrow | 119/1 |
| 4,897,183 A | 1/1990 | Lewis, Jr. et al. | 209/235 |
| 4,934,317 A | 6/1990 | Pourshalchi | 119/1 |
| 4,949,672 A | 8/1990 | Ratcliff et al. | 119/1 |
| 4,949,673 A | 8/1990 | Yamamoto | 119/1 |
| 5,012,765 A | 5/1991 | Naso et al. | 119/166 |

(Continued)

FOREIGN PATENT DOCUMENTS

AU  752371  9/2002

(Continued)

OTHER PUBLICATIONS

Halter K. Sma Household-Applications From Superelastic Tooth Brush to Fully Automated Cat's Toilet XP002118865, Aug. 20, 1995.

(Continued)

*Primary Examiner* — Monica Williams
(74) *Attorney, Agent, or Firm* — Armstrong Teasdale LLP

(57) ABSTRACT

Embodiments of the present invention generally relate to an automatic self cleaning litter box. In accordance with one embodiment, an apparatus is provided that includes a litter receptacle, a drive unit moveably coupled to the litter receptacle, and a sieve coupled to the drive unit such that the sieve possesses at least two degrees of freedom of movement relative to the litter receptacle and at least one degree of freedom of movement relative to the drive unit.

46 Claims, 15 Drawing Sheets

U.S. PATENT DOCUMENTS

| | | | |
|---|---|---|---|
| 5,048,463 A | 9/1991 | Wilson et al. | 119/163 |
| 5,048,465 A * | 9/1991 | Carlisi | 119/166 |
| 5,107,797 A | 4/1992 | LaRoche | 119/166 |
| 5,168,834 A | 12/1992 | Buschur | 119/166 |
| 5,178,099 A | 1/1993 | Lapps et al. | 119/166 |
| 5,184,575 A | 2/1993 | Reinartz | 119/163 |
| 5,188,062 A | 2/1993 | Joy et al. | 119/164 |
| 5,220,886 A | 6/1993 | Hyde | 119/165 |
| 5,226,388 A * | 7/1993 | McDaniel | 119/166 |
| 5,249,549 A | 10/1993 | Rockaitis, III | 119/165 |
| 5,259,340 A | 11/1993 | Arbogast | 119/166 |
| 5,267,530 A | 12/1993 | Zamoyski | 119/166 |
| 5,272,999 A | 12/1993 | Nussle | 119/166 |
| 5,279,258 A | 1/1994 | Kakuta | 119/164 |
| 5,460,122 A | 10/1995 | Reinartz | 119/164 |
| 5,462,015 A | 10/1995 | Murphy | 119/19 |
| 5,477,812 A | 12/1995 | Waters | 119/163 |
| 5,511,513 A | 4/1996 | Baron et al. | 119/163 |
| 5,544,620 A | 8/1996 | Sarkissian | 119/166 |
| 5,564,364 A | 10/1996 | Kovacs et al. | 119/163 |
| 5,572,950 A | 11/1996 | O'Rourke et al. | 119/165 |
| 5,592,900 A | 1/1997 | Kakuta | 119/164 |
| 5,623,892 A | 4/1997 | O'Rourke et al. | 119/165 |
| 5,645,013 A | 7/1997 | Redmond | 119/170 |
| 5,662,066 A | 9/1997 | Reitz | 119/163 |
| 5,727,691 A | 3/1998 | Vittrup | 209/235 |
| 5,794,566 A | 8/1998 | Goetz et al. | 119/161 |
| 5,797,346 A | 8/1998 | Lewis | 119/166 |
| 5,799,610 A | 9/1998 | Poulos | 119/166 |
| 5,806,461 A | 9/1998 | Kiera | 119/165 |
| 5,931,119 A | 8/1999 | Nissim et al. | 119/163 |
| 6,082,302 A | 7/2000 | Thaler et al. | 119/161 |
| RE36,847 E | 9/2000 | Waters | 119/163 |
| 6,202,595 B1 | 3/2001 | Atcravi | 119/165 |
| 6,205,954 B1 | 3/2001 | Bogaerts | 119/166 |
| 6,378,461 B1 * | 4/2002 | Thaler et al. | 119/166 |
| 6,925,961 B2 | 8/2005 | Langdale | 119/166 |
| 2003/0051672 A1 * | 3/2003 | Gordon et al. | 119/166 |
| 2003/0217700 A1 | 11/2003 | Northrop et al. | 119/166 |
| 2007/0056521 A1 | 3/2007 | Caputa et al. | 119/166 |

FOREIGN PATENT DOCUMENTS

| | | |
|---|---|---|
| CA | 2069517 | 11/1993 |
| CA | 2276500 | 1/2000 |
| CA | 2165866 C | 5/2004 |
| CA | 2536850 | 9/2006 |
| CA | 2558950 | 3/2007 |
| DE | 29718260 | 2/1998 |
| EP | 0154540 | 9/1985 |
| EP | 0227155 | 7/1987 |
| EP | 0297015 | 12/1988 |
| EP | 0875140 A2 | 1/1996 |
| EP | 0721731 | 7/1996 |
| EP | 0972442 A1 | 2/2002 |
| JP | 681245 | 11/1994 |
| JP | 2981163 | 9/1996 |
| JP | 8238035 | 9/1996 |
| JP | 3308242 | 3/2000 |
| JP | 3349474 | 3/2000 |

OTHER PUBLICATIONS

European Search Report EP 0 972 442, 2 pages, Oct. 14, 1999.

Defendant Doskocil Manufacturing Company Inc.'s Original Answer and Counterclaims, 8 pages, Mar. 29, 2007.

Invalidity Contentions of Defendant Doskocil Manufacturing Company, Inc., 27 pages, Sep. 10, 2007.

Lucky Litter's Disclosures Pursuant to Patent Rules 3-3 and 3-4, 12 pages, Sep. 11, 2007.

Non-Final Office Action, U.S. Appl. No. 10/837,273, 7 pages, mailed Jun. 28, 2005.

Final Office Action, U.S. Appl. No. 10/837,273, 7 pages, mailed Mar. 7, 2006.

Non-Final Office Action, Canadian Patent Application No. 2,596,950, 2 pages, mailed Nov. 13, 2008.

Non-Final Office Action, U.S. Appl. No. 11/780,367, 7 pages, mailed Dec. 11, 2008.

Non-Final Office Action, U.S. Appl. No. 11/780,410, 5 pages, mailed Dec. 15, 2008.

Examiner's Answer, U.S. Appl. No. 10/837,273, 7 pages, mailed Dec. 30, 2008.

* cited by examiner

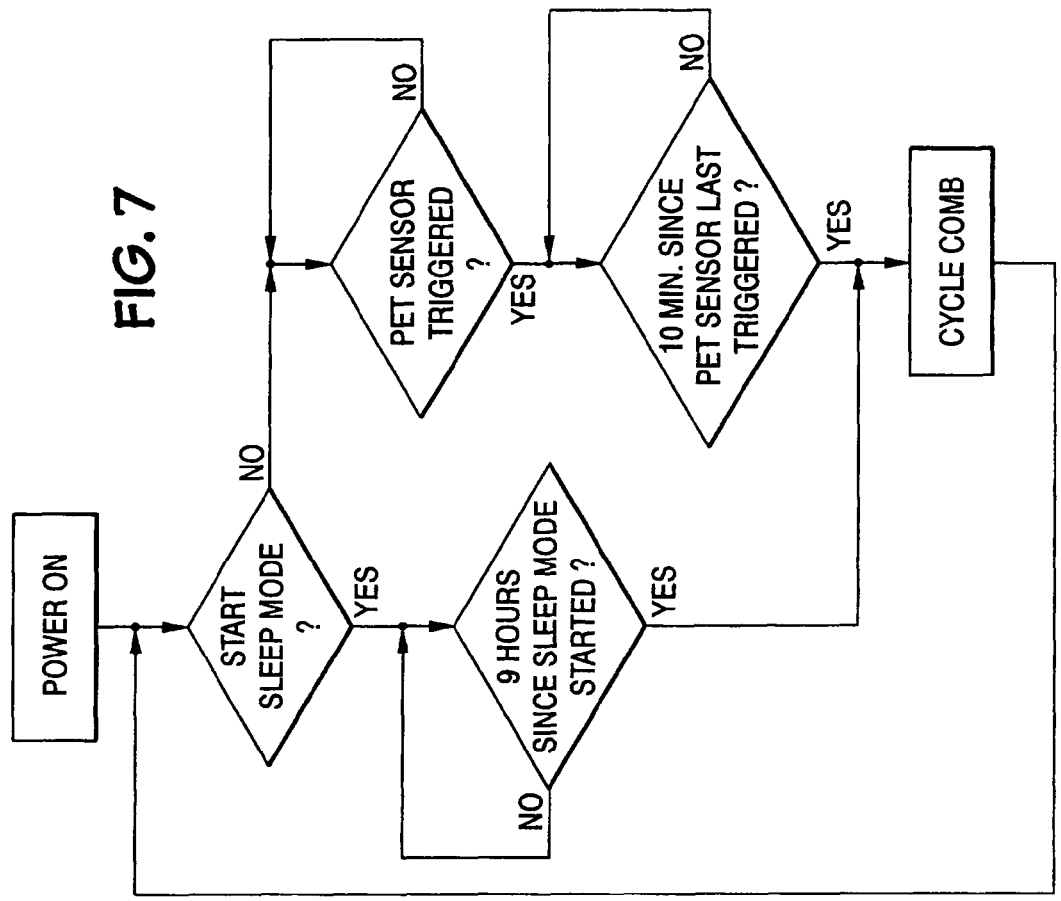
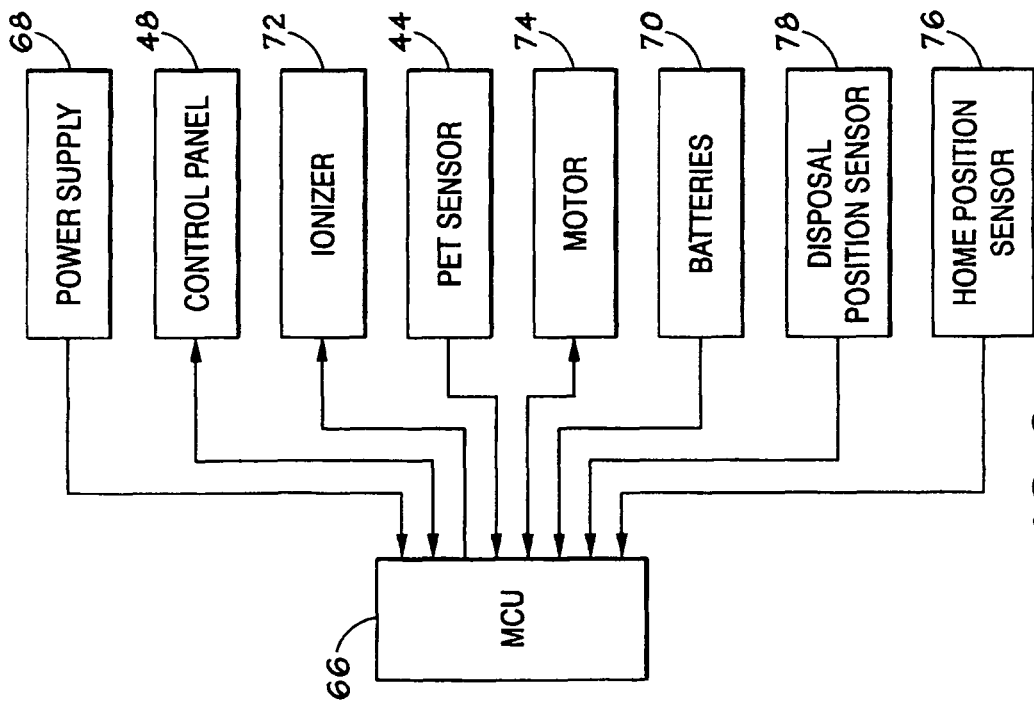

SELF CLEANING LITTER BOX

BACKGROUND

The present invention relates generally to pet accessories and, more particularly, to an automatic self cleaning litter box.

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Pet owners have long sought a convenient and sanitary way to deal with pet waste generated inside the household. With some success, many pet owners train their pets to expel waste in a container housing a disposable absorbent medium. Encasing the pet waste, the absorbent medium forms clumps that the pet owner later removes. However, early absorbent mediums presented almost as many problems as they solved. Prior to the invention of cat litter in the 1920's, pet owners used ashes to absorb pet waste. To the frustration of pet owners, the ashes quickly spread throughout the house in the form of paw prints. Cat litter, on the other hand, includes heavy clay particles that absorb pet waste but that are not as easily carried from the litter box by a pet's paws.

However, the traditional litter box left pet owners with a highly unpleasant recurring task, cleaning the litter box. To avoid the buildup of pet waste, pet owners still must clean the litter box by manually sifting clumps of pet waste from the litter with a hand held plastic comb or scoop. The pet owner runs the comb through the litter and deposits the pet waste in a separate bin for disposal. This places pet owners in close proximity to pet waste, a situation many pet owners find both unsanitary and unpleasant. Thus, simply training a pet to use a litter box is, at best, a partial solution to the problem of pet waste disposal.

In an effort to avoid the shortcomings of the traditional litter box, pet owners turned to automatic self cleaning litter boxes, which relieved pet owners of manually sifting litter clumps from litter. To separate the clumps most automatic self cleaning litter boxes employ a mechanically driven comb, a pet sensor, and a waste receptacle to store the litter clumps. As a pet expels waste in an automatic self cleaning litter box, the pet sensor detects the pet's presence. Then, some time after the pet sensor ceases to detect the pet's presence, the mechanically driven comb automatically sifts the larger litter clumps from the smaller loose litter particles. Multiple tines extending from the comb and into the litter are spaced far enough apart to allow the small loose litter particles to pass between the tines. As the comb sifts through the litter, it collects the clumps, which are too large to pass through the space between the tines. The comb deposits the clumps in a waste bin and leaves the unused litter in the litter box. Thus, the automatic self cleaning litter box relieved pet owners of separating and storing the clumps.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided an apparatus that includes: a litter receptacle; a drive unit moveably coupled to the litter receptacle; and a sieve coupled to the drive unit, wherein the sieve is coupled with at least two degrees of freedom of movement relative to the litter receptacle and at least one degree of freedom of movement relative to the drive unit.

There is provided an apparatus that includes: a litter receptacle with a first interior side and a second interior side that are substantially parallel to a direction of travel; a drive unit coupled to the litter receptacle, wherein the drive unit is configured to apply a driving force to a sieve in the direction of travel and a reactive force to the litter receptacle that opposes the driving force applied to the sieve, wherein the reactive force is applied to the litter receptacle at a first region and a second region; a sieve coupled to the drive unit, wherein the sieve is coupled with at least two degrees of freedom of movement relative to the litter receptacle and at least one degree of freedom of movement relative to the drive unit; a first ramp attached to the first interior side of the litter receptacle; and a second ramp that is substantially parallel to the first ramp and that is attached to the second interior side of the litter receptacle, wherein the second ramp is a distance away from the first ramp that is less than a component of a vector between first region and the second region that is perpendicular to the direction of travel.

There is provided an apparatus that includes: a litter receptacle; a drive unit coupled to the litter receptacle; and a sleep timer configured to reduce the noise emitted by the drive unit and the litter receptacle for a period of time of at least 5 hours and automatically perform a sweep cycle at the end of the period of time.

There is provided an apparatus that includes: a litter receptacle; a drive unit moveably coupled to the litter receptacle; a sieve coupled to the drive unit; and a ribbon cable attached to the drive unit and the litter receptacle.

There is provided an apparatus that includes: a litter receptacle; a drive unit coupled to the litter receptacle; a sieve coupled to the drive unit; and an active air freshener coupled to the litter receptacle.

There is provided a sieve for an automatic self cleaning litter box that includes: a chassis with a first side, a second side, a bottom, a front face, and a rear face; a plurality of tines extending from the bottom of the chassis; a first guide member extending from the first side of the chassis; a second guide member extending from the second side of the chassis; and a vertical slide rail extending from the rear face of the chassis, wherein the vertical slide rail is configured to slideably couple to a drive unit.

There is provided a method of manufacturing an automatic self cleaning litter box that includes: providing a litter receptacle; providing a drive unit adapted to be moveably coupled to the litter receptacle; and providing a sieve adapted to be coupled to the drive unit such that the sieve possesses at least two degrees of freedom of movement relative to the litter receptacle and at least one degree of freedom of movement relative to the drive unit.

There is provided a method of manufacturing an automatic self cleaning litter box that includes: providing a litter receptacle; providing a drive unit; and providing an ionizer.

There is provided a method of manufacturing an automatic self cleaning litter box that includes: providing a litter receptacle including a power supply; providing a drive unit including an electric motor, wherein the drive unit is adapted to be moveably coupled to the litter receptacle; providing a sieve adapted to be coupled to the drive unit; and providing a ribbon cable adapted to place the electric motor and the power supply in electrical communication.

There is provided an automatic self cleaning litter box that includes: a litter receptacle with an interior; a sieve coupled to the litter receptacle; and a device adapted to transmit energy from the litter receptacle to the sieve that is shielded from the interior of the litter receptacle.

There is provided an apparatus that includes: a litter receptacle; a drive unit coupled to the litter receptacle; a sieve coupled to the drive unit; a waste receptacle lid coupled to the litter receptacle; and a first magnet coupled to the waste receptacle lid. There is provided an apparatus that includes: a litter receptacle with an interior; a privacy tent disposed about the interior of the litter receptacle; a drive unit coupled to the litter receptacle; and a sieve that is slideably coupled to the drive unit such that the sieve may be removed without removing the privacy tent.

BRIEF DESCRIPTION OF THE DRAWINGS

A more complete understanding of the present disclosure may be acquired by referring to the following description taken in conjunction with the accompanying drawings wherein:

FIG. 6 is a box chart depicting the relationship of the microcontroller unit to the other electronic components of an exemplary automatic self cleaning litter box;

FIG. 7 is a flow chart illustrating the operation of the microcontroller;

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Despite their advantages, existing automatic self cleaning litter boxes may be improved. For example, many pet owners find the smell of pet waste emitted by an automatic self cleaning litter box unpleasant. Aggravating the problem, pet waste frequently collects in the waste receptacle of an automatic self cleaning litter box over longer periods of time than in a traditional litter box, because pet owners are freed from cleaning the litter box on a daily basis. Secondly, as the comb sifts through the litter, softer clumps may adhere to the comb, reducing its effectiveness. Some pet owners find the mechanically driven comb difficult to clean. Specifically, pet owners find it difficult to remove a soiled comb for cleaning. Separating the comb from an automatic self cleaning litter box may involve the use of tools in close proximity to pet waste, leaving the pet owner's hands and tools potentially soiled. Thirdly, while not in direct contact with pet waste, other exposed moving parts of an automatic self cleaning litter box may also require cleaning. For example, if litter and pet waste soil the mechanism for delivering power to the comb, the pet owner is left with another moving part to clean. Finally, if the owner adds more than the recommended amount of litter, the automatic self cleaning litter box may cease to function, because the excess litter may obstruct the travel of the mechanically driven comb. The pet owner is left to remove soiled litter manually and unblock the comb, a task many pet owners find highly undesirable. In short, while the traditional automatic self cleaning litter box may offer some relief to pet owners, pet waste disposal could be made more convenient.

Figure 1:
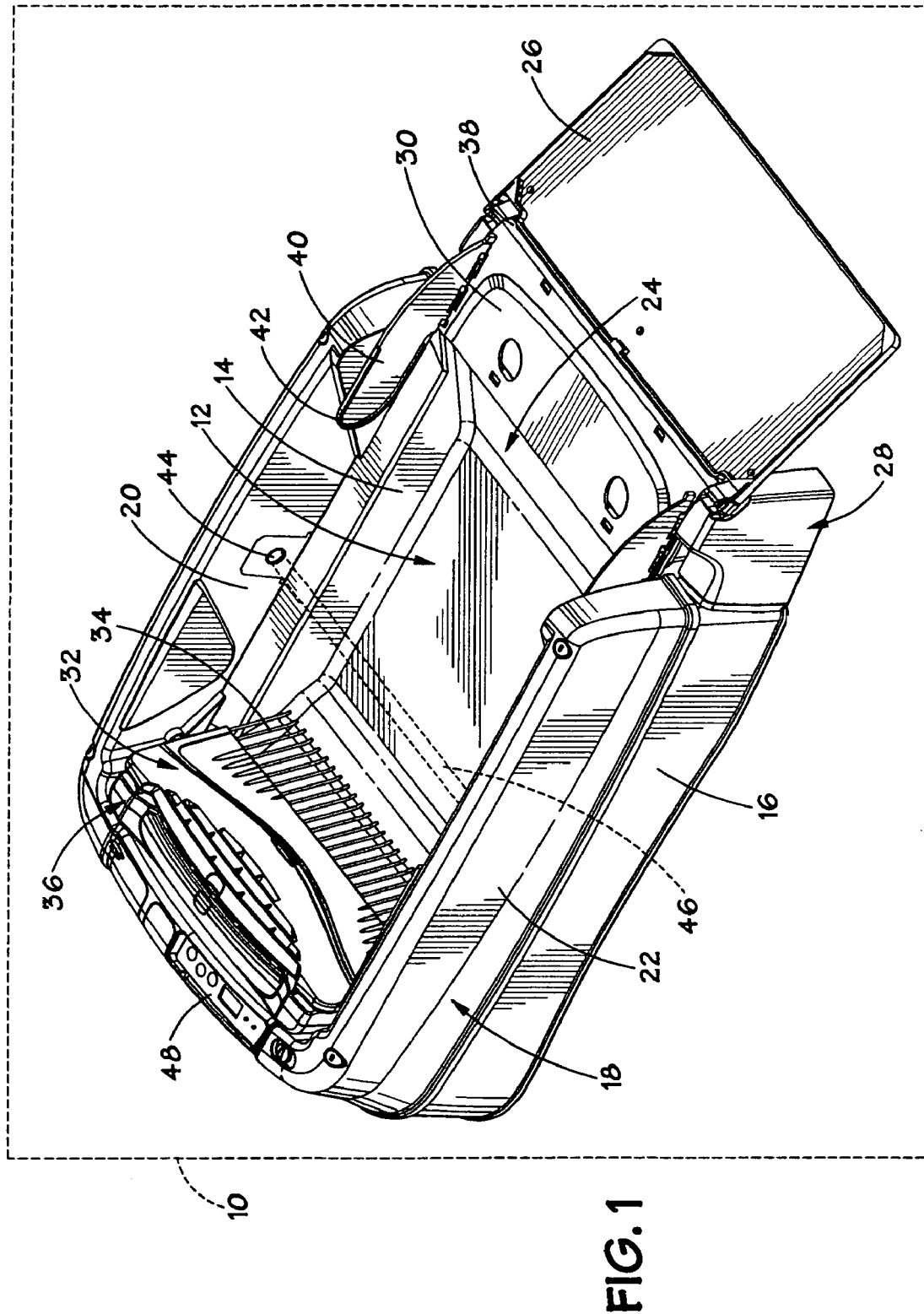
FIG. 1 is a perspective view of one exemplary embodiment of an automatic self cleaning litter box in accordance with the present technique.

FIG. 1 illustrates an exemplary automatic self cleaning litter box 10 that may address some of the issues with existing automatic self cleaning litter boxes. To explain these innovations, the basic structural components of the automatic self cleaning litter box 10 are described before the automatic features.

A tray 12 forms the base of the automatic self cleaning litter box 10 and holds the litter. The tray 12 may have dimensions selected to contain a volume of litter that is sufficient to absorb pet waste deposited between litter refills. At the same time, the capacity of the automatic features (examples of which are subsequently described) to drive a comb through the litter may constrain the dimensions of the tray 12, as a larger volume of litter may require more power. Other concerns may guide the selection of specific dimensions. For example, to encourage a pet to use the automatic self cleaning litter box 10, a tray length and width that permits a pet to fit comfortably within the tray 12 may be selected. The tray 12 may act as a base on which other components are mounted. To provide a stable base, the tray 12 may include an inner wall 14 and an outer wall 16 that cooperate to support these components and broaden the tray's foundation.

An upper housing 18 may rest above the tray 12 and house or support many of the components directed toward the automatic features of the automatic self cleaning litter box 10. Consequently, the height of the upper housing 18 may be at least as high as the components it supports, such as the subsequently discussed disposal position ramp. However, in other embodiments, these components may extend above the upper housing 18. Indeed, one reason to limit the height of the upper housing 18 is to encourage smaller pets to use the automatic self cleaning litter box 10, as they may prefer to enter or exit over the side. To house components, the upper housing 18 may include an inner side wall 20 and an outer side wall 22. Together, these side walls 20-22 define an interior space (not shown) that may be shielded from litter and pet waste. Advantageously, components within this space may not require cleaning. The side walls 20-22 of the upper housing 18 may also interface with the tray 12 to secure the upper housing 18 to the tray 12. To this end, the distance between the inner and outer side walls 20-22 of the upper housing 18 may vary from wider to narrower with increasing height. The wider portion may extend over the sides of the tray 12 to stabilize the upper housing 18 laterally, and the narrower portion may rest on the top of the tray 12 to support the upper housing 18 vertically. However, in other embodiments, the upper housing 18 may attach to the tray 12 in a different manner or be integrated into the tray 12 as a single part. Together the tray 12 and the upper housing 18 form an example of a litter receptacle.

Several components, including the upper housing 18, may facilitate a pet's entry into the tray 12. In one embodiment, the upper housing 18 may include an open face 24 at one end, through which a pet may pass. The size of the open face 24 may depend in part on the size of the pet expected to use the automatic self cleaning litter box 10, as a larger pet may desire a larger path to the tray 12. For example, the open face 24 may extend partially across one side of the tray 12 for smaller pets, or across more than one side for larger pets. Further facilitating pet entry, the automatic self cleaning litter box 10 may include a ramp 26. The ramp 26 may extend from the height of the tray 12 down to the floor, providing a gradual climb up and into the automatic self cleaning litter box 10 for pets. The ramp 26 may clip to the edge of a waste receptacle 28, which is discussed in greater detail below, or any other elevated portion of the automatic self cleaning litter box 10 over which a pet is expected to pass. Finally, a waste receptacle lid 30, also discussed in more detail below, may bridge the waste receptacle 28 and complete the path to the tray 12. These features that facilitate pet entry may prove especially beneficial to owners of heavy set, short legged or less active pets that may be deterred by the prospect of traversing a wall of the upper housing 18 or tray 12 from the floor.

The automatic self cleaning litter box 10 may include a system of mechanical components that automatically remove pet waste from the tray 12. In the exemplary embodiment of FIG. 1, the automatic self cleaning litter box 10 may include a comb 32 to separate pet waste from loose litter. The comb 32 is one example of a sieve. The comb 32 may include a plurality of tines 34 extending toward the bottom of the tray 12. The tines 34 may be spaced wide enough apart that, when pushed through the litter, loose litter particles pass between the tines 34 while larger clumps of pet waste are entrained by the tines 34. To remove pet waste buried deep in the litter, the tines 34 may extend along their length from the highest anticipated litter fill height to the bottom of the tray 12. Similarly, the width of the comb 32 may reach from one inner wall 14 of the tray to the opposing inner wall 14 to remove pet waste from the entire tray 12 in one sweep, as pet waste may gather in the corners of the tray 12. Alternatively, if the device that drives the comb 32 is unable to push a comb of this size, a smaller comb that extends across a portion of the tray 12 may be employed by driving it through multiple sweeps across the tray 12. A motor assembly 36, which is one example of a drive unit, may drive the comb 32 across the tray 12 and through the litter. The motor assembly 36 may include a motor and components that interface with a track inside the upper housing 18, all of which is described in detail below. While being driven horizontally across the tray 12, as will also be described in greater detail below, the comb 32 may vertically float on the motor assembly 36. For example, as is explained in the context of FIG. 13, the comb 32 may slideably attach to the front of the motor assembly 36. Advantageously, a floating comb 32 may elevate and glide over litter that is of uneven or excessive depth, thus avoiding a potential obstruction. At the same time, other components may ensure that the comb 32 penetrates the litter to some degree and that the comb 32 lifts above the litter at the appropriate points. For example, to vertically position the comb 32, subsequently discussed ramp structures on the side of the upper housing 18 may force the comb 32 down into and up out of the litter as the comb 32 travels across the tray 12. Advantageously, as subsequent figures depict more clearly, the comb 32 may attach to the motor assembly 36 such that a pet owner may remove it without the use of tools, freeing pet owners from operating tools near pet waste when removing the comb 32 for cleaning.

In the embodiment of FIG. 1, other components sitting at the opposite end of the tray 12 from the comb 32 may receive and store pet waste that is removed from the tray 12. For example, a waste receptacle 28 may receive pet waste pushed out of the tray 12 by the comb 32. The waste receptacle 28 may attach to the end of the tray 12 below the open face 24 of the upper housing 18, avoiding the need to lift pet waste over the edge of the upper housing 18. The edge of the waste receptacle 28 nearest the tray 12 may be low enough that the comb 32 may pass over the edge, allowing pet waste to drop from the comb 32 and into the waste receptacle 28. The waste receptacle 28 may store pet waste itself, or it may house a waste receptacle liner (not shown) to store pet waste. The waste receptacle liner is described in greater detail below in reference to FIG. 15. It is important to note that the waste receptacle 28 need not be a container, as it may simply position and provide structural support to a waste receptacle liner.

A waste receptacle lid 30 may cover the waste receptacle 28 and provide passage to pets entering the tray 12. Thus, in the exemplary embodiment of FIG. 1, the waste receptacle lid 30 may assume at least two positions relative to the waste receptacle 28: open when the comb 32 is depositing waste and closed at other times to allow a pet to pass over the waste receptacle 28. The waste receptacle lid 30 may attach to the waste receptacle 28 through a hinge 38 to allow the waste receptacle lid 30 to open when depositing waste. Alternatively, though less preferably, the waste receptacle lid 30 may slideably couple to the waste receptacle 28, pivot about a vertical axis, pivot about an axis parallel to the length of the tray 12, or couple to the waste receptacle in any manner that allows it to open when the comb 32 deposits waste. Where the waste receptacle lid 30 is slideably coupled or coupled to pivot about a vertical axis, some mechanism to return the waste receptacle lid 30 to a position over the waste receptacle 28, such as a spring or cam that engages the comb 32, may be employed.

Cam arms 40 may extend from the waste receptacle lid 30 and over the tray 12 to open the waste receptacle lid 30. In operation, as explained in greater detail below, the comb 32 may push open the waste receptacle lid 30 as it sweeps into the disposal position by lifting the cam arms 40. To reduce friction when sliding up the face of the comb 32 and increase their rigidity, the cam arms 40 may include a flat surface 42 that is perpendicular to the length of the cam arms 40 at their distal ends. Alternatively, to further reduce friction, the end of the cam arms 40 may include a wheel to roll up the face of the comb 32. The cam arms 40 may attach to the waste receptacle lid 30 in a manner that allows a pet owner to reattach them if they are stressed by a pet and inadvertently broken away.

Alternatively, opposing magnets may open the waste receptacle lid 30. In one embodiment, a magnet may couple to the waste receptacle lid 30 and an opposing magnet may couple to the comb 32 or motor assembly 36. The opposing magnet may be oriented so that the magnetic field from one or both poles repels the magnet on the waste receptacle lid 30, opening the waste receptacle lid 30 without contacting it. Both or one of the magnets may be electromagnets.

Various other features of the exemplary automatic self cleaning litter box 10 depicted in FIG. 1 may facilitate its use. For example, the automatic self cleaning litter box 10 may include an ionizer (not shown in FIG. 1) to reduce the spread of litter dust and smells. As depicted in greater detail in FIG. 13, the motor assembly 36 may house the ionizer to keep the ionizer close to the comb 32 as it stirs up litter during a sweep. However, other embodiments may affix the ionizer to a stationary component to simplify power delivery to the ionizer. Additionally, as will be explained in greater detail below, the automatic self cleaning litter box 10 may include a pet sensor 44 to detect when a pet is in the tray 12. By detecting the pet's presence, certain embodiments may operate the comb 32 in response to a pet entering the tray 12 to remove any waste the pet may have left. Additionally, some embodiments may avoid operating the comb 32 while the pet is in the tray 12, as failing to do so might startle a pet that re-enters the tray. The pet sensor 44 may transmit an infrared beam of light 46 across the tray 12 and sense if the beam 46 traverses the tray with a photovoltaic detector. Thus, when a pet enters the tray 12, it may interrupt the beam of light 46, and the photovoltaic detector may register a change in voltage. In other embodiments, the pet sensor 44 may include any device capable of detecting the presence of the pet, such as an accelerometer, strain gauge, or microphone. Finally, the automatic self cleaning litter box 10 may include a control panel 48 through which a pet owner may program the automatic self cleaning litter box 10 to perform certain tasks, such as entering a sleep mode that is subsequently discussed. The control panel 48 may include various buttons and displays to communicate with the pet owner. However, instead of or in addition to a control panel 48, the automatic self cleaning litter box 10 may include any interface that allows the automatic self cleaning litter box 10 to receive instructions from a pet owner, such as a serial port, a keyboard port, a microphone coupled with voice recognition software, a network port, or a light pen, for example.

To explain the operation of the automatic self cleaning litter box 10 in more detail, FIGS. 2-5 depict the automatic self cleaning litter box 10 of FIG. 1 receiving and disposing of pet waste. Using the same perspective view as FIG. 1, the figures depict a pet triggering a sweep cycle and the various stages of a sweep cycle, including the automatic self cleaning litter box 10 with the comb 32 in the home position, at an intermediate point in the sweep cycle, and in the disposal position.

Figure 2:
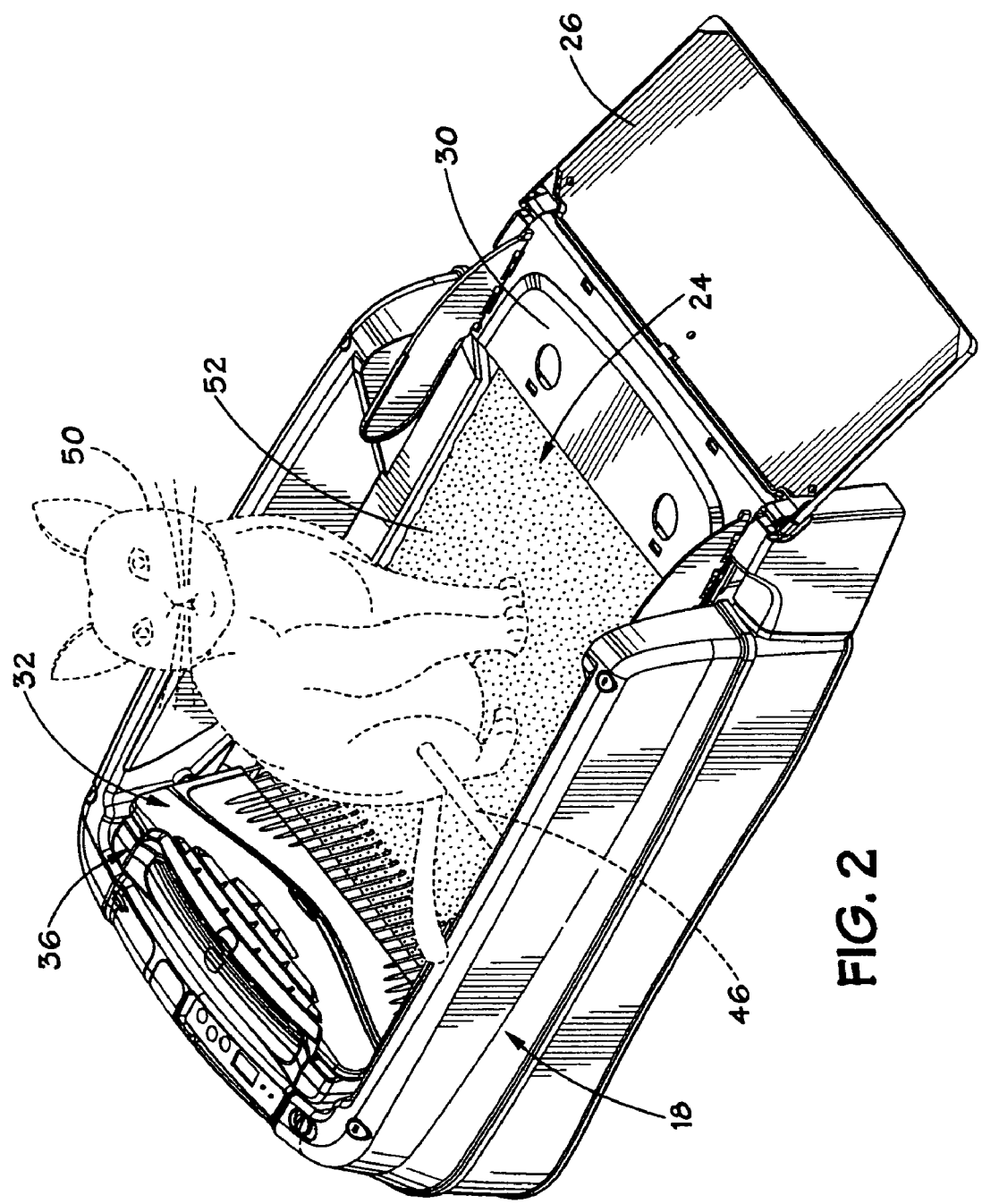
FIG. 2 is a perspective view of the automatic self cleaning litter box of FIG. 1 in use by a pet.

FIG. 2 illustrates an event that may trigger a sweep cycle, such as a cat 50 depositing waste in the automatic self cleaning litter box 10. As previously explained, the cat 50 may enter the automatic self cleaning litter box 10 by walking up the ramp 26, over the waste receptacle lid 30, and through the open face 24 of the upper housing 18. It should be noted that applications of this embodiment are not limited to cats and may include rabbits, dogs, ferrets, weasels, monkeys, or any other animal to which the features of the automatic self cleaning litter box 10 have been adapted Litter 52 may receive the cat's waste. Preferably, the litter 52 is premium clumping litter selected to quickly form clumps with enough rigidity that they do not fracture on contact with the comb 32. Less advantageously, instead of or in combination with premium clumping litter, other forms of litter, sawdust, ashes, oat hulls, wheat mits, silica, clay, clumping clay, guar gum, bentonite, paper, or any other disposable absorbent medium may be employed.

As the pet deposits waste, the pet sensor 44 may detect that a pet has entered the automatic self cleaning litter box 10. As previously explained, the pet sensor 44 may include a light source to create a beam of light 46 that a pet entering the tray 12 may interrupt and a sensor to detect when the beam 46 is interrupted. Preferably, the light source emits light outside the visible spectrum so as to not disturb pet owners at night, such as infrared light. However, other frequencies of light may be employed in accordance with the present techniques. The light source may include an LED to reduce the need for replacement bulbs without incurring higher manufacturing costs associated with other long lasting light sources. Less advantageously, the pet sensor 44 may employ ambient lighting, a laser, OLED, incandescent bulb, fluorescent bulb, or any other light source with enough power that a sensor can detect light emitted by it from across the tray 12. In the embodiment depicted in FIG. 2, a photovoltaic sensor may detect the presence of the beam of light 46. When the photovoltaic sensor ceases to detect the light beam 46, such as when a pet enters the tray 12 and interrupts the beam 46, it may produce a change in voltage that is registered by a microcontroller (not presently shown, but subsequently discussed in reference to FIG. 7). The light source and photovoltaic sensor may reside in alignment on opposing sides of the tray 12, so the beam of light 46 produced by the light source impinges upon the photovoltaic sensor. Alternatively, to simplify the delivery of power to these components, they may both be located adjacent one another on the same side of the tray 12 in alignment with a mirror placed on the opposite side of the tray 12 to reflect the beam 46 from the light source back to the photovoltaic detector. The components of the pet sensor 44 may be mounted to the upper housing 18, the tray 12, or any structure that permits a beam 46 to traverse the tray 12 and reach the photovoltaic sensor. However, preferably the components of the pet sensor 44 sit high enough to prevent the beam 46 from hitting the litter 52 while still ensuring that the smallest pet expected to use the automatic self cleaning litter box 10 will still interrupt the beam 46. Advantageously, by detecting the presence of a pet in the tray 12, the automatic self cleaning litter box 10 may ensure that the comb 32 does not rake the litter 52 while the cat 50 is in the tray 12, as such an event could inadvertently startle the cat 50 and deter future use of the device.

Figure 3:
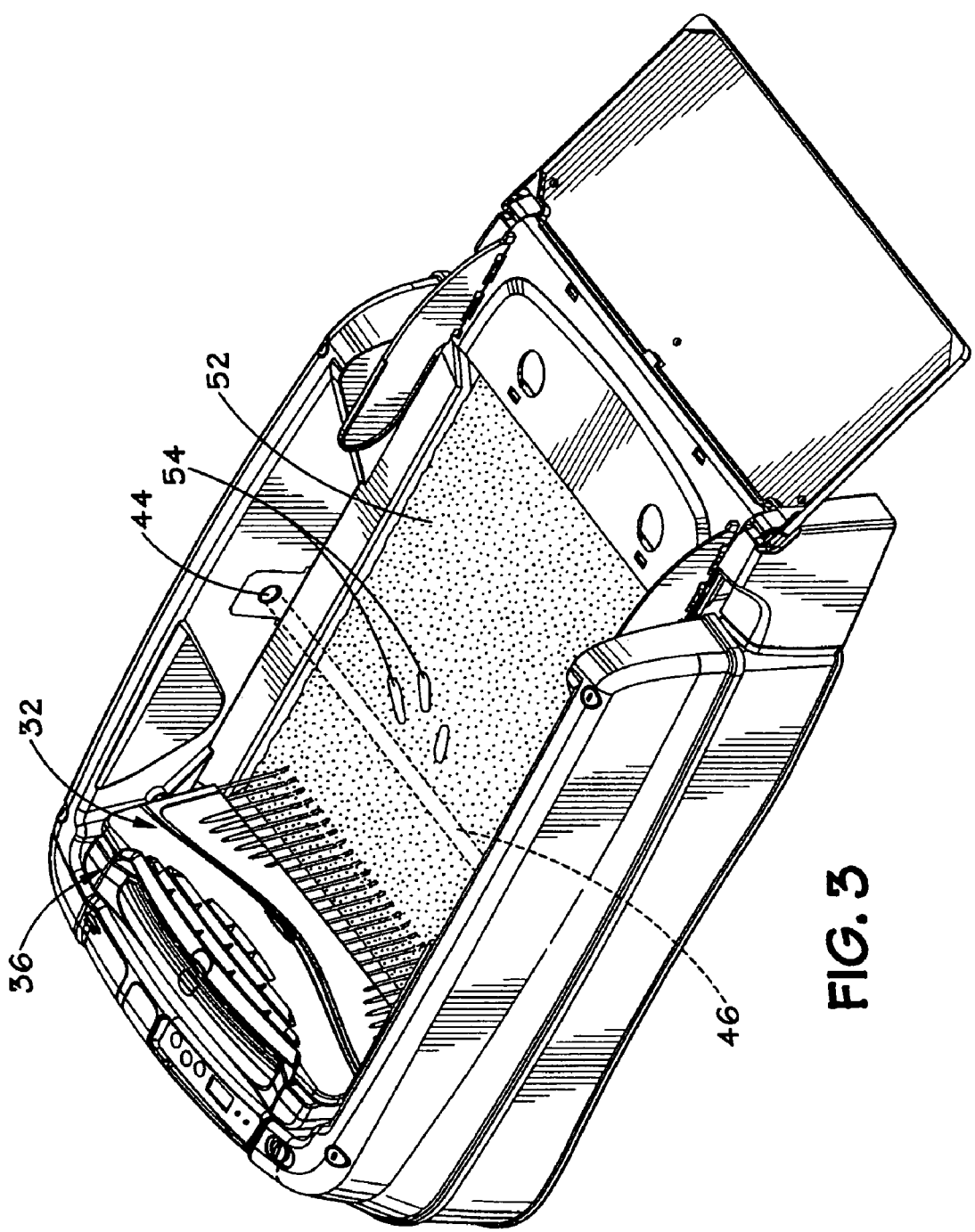
FIG. 3 is a perspective view of the automatic self cleaning litter box of FIG. 2 after a pet expelled waste but before the start of a sweep cycle.

Once the pet finishes expelling waste and exits the tray 12, the pet may leave the automatic self cleaning litter box 10 in the state depicted in FIG. 3. In the present embodiment, the beam 46 from the pet sensor 44 returns to an uninterrupted state, and the microcontroller registers a change in voltage produced by the photovoltaic sensor receiving light from the light source. Clumps 54 may begin to form as the litter 52 absorbs and encases the pet waste. The clumps 54 are depicted on the surface of the litter 52 to illustrate their presence, but the pet may often bury the clumps 54 in the litter 52. To promote the formation of clumps 54, a microcontroller (not presently shown, but described later in reference to FIG. 6) may be programmed to wait for a period of time, such as 10 minutes, after the beam 46 most recently returned to its unbroken state before sweeping the comb 32 through the litter 52. Alternatively, if the litter 52 forms clumps quickly, the controller may be programmed to not delay before starting a sweep cycle, and the state depicted in FIG. 3 may occur momentarily before the comb 32 begins to sift through the litter 52.

It should be noted that once the sweep cycle starts the microcontroller may respond differently to a signal from the pet sensor 44, as the comb 32 and motor assembly 36 may interrupt the beam 46 while crossing the tray 12. For example, the microcontroller may disregard the signal, or it may use the signal as feedback to indicate the position of the motor assembly 36. In one embodiment, the microcontroller may be programmed to sound an alarm if motor assembly 36 fails to interrupt the beam 46 within a certain period of time, indicating an obstructed comb. In another embodiment, the microcontroller may be programmed to sense the speed of the motor assembly 36 based on when it interrupts the beam 46 and regulate its speed in response.

Figure 4:
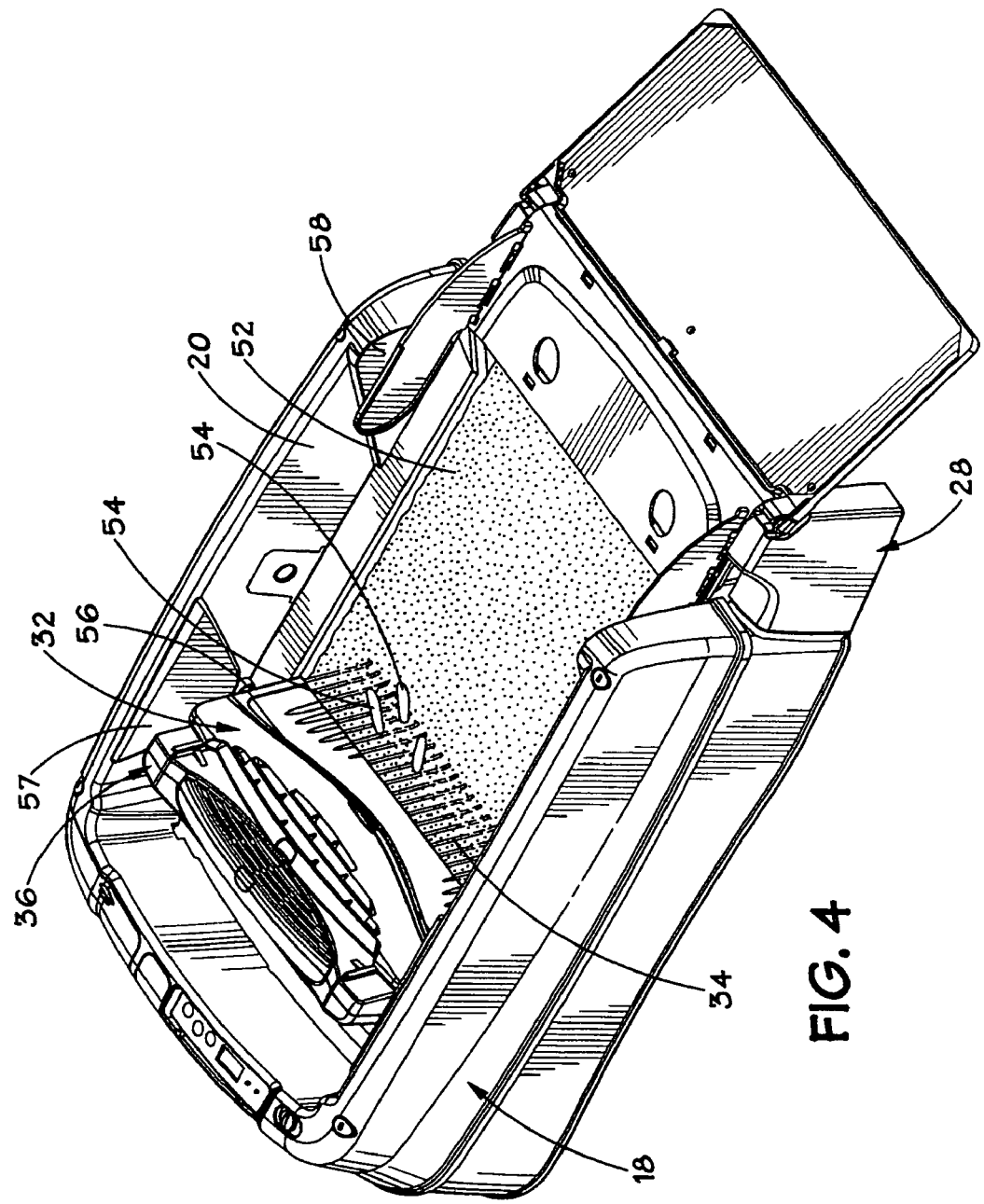
FIG. 4 is a perspective view of the automatic self cleaning litter box of FIG. 2 after a pet expelled waste with the comb at an intermediate position in a sweep cycle.

After the delay to allow the litter 52 to clump, the motor assembly 36 may begin to drive the comb 32 through the litter 52. FIG. 4 illustrates the comb 32 midway through a sweep. During a sweep cycle, the motor assembly 36 pushes the comb 32 horizontally across the tray 12, from the home position illustrated in FIGS. 1-3, past the intermediate position depicted in FIG. 4, to the disposal position depicted in FIG. 5. At the same time, the tines 34 extending from the comb 32 pass through the litter 52, gathering clumps 54. Enhancing the penetration of the tines 34 into the litter 52, the comb 32 may slide down the face of the motor assembly 36 toward the bottom of the tray 12.

The comb 32 may interface with a series of ramps as it transits the tray 12 to drive the comb 32 down into and up out of the litter 52. Guide wheels 56 extending from each side of the comb 32 may roll on the surface of these ramps, such as the subsequently discussed v-plate 57, disposal position ramp 58, and home position ramp 60 (not shown due to the position of the motor assembly 36). Alternatively, to reduce complexity at the expense of a potentially increased load on the motor, a guide pin or other device may slide against these ramps. To ensure that the guide wheels 56 contact the ramps 57-60, the guide wheels 56 may extend from the side of the comb 32 adjacent the walls of the upper housing 18 supporting the ramps. Preferably, the guide wheels 56 extend far enough from the comb 32 to ensure they contact the ramps during a sweep but not the inner wall 20 of the upper housing 18, as contacting the inner wall 20 may interfere with the transit of the comb 32.

Turning to the ramps, a v-plate 57 may interface with the guide wheel 56 to drive the comb 32 down into the litter 52. The v-plate 57 may extend from the inner wall 20 of the upper housing 18, preferably far enough that the guide wheel 56 will roll against it but not so far as to obstruct the comb 32 or motor assembly 36. The v-plate 57 may be integrated into the wall of the upper housing 18 to reduce the number of parts and enhance its strength, or it may be a separate part clipped, glued, fused, or attached in any other manner to the upper housing 18. A non-integrated v-plate 57 may be preferred where the upper housing 18 is manufactured with an injection molding process to simplify separating the upper housing 18 from its mold, as the v-plate 57 may interfere with the removal of a two piece mold. Alternatively, if the side walls of the tray 12 extend high enough to support the v-plate 57, it may be attached to the tray 12, or it may be part of the tray 12. The v-plate 57 may include two sloped faces with symmetric opposing gradients on which the guide wheel 56 rolls, forcing the comb 32 down into the litter 52. The power of the device driving the comb may guide the selection of the sloped surfaces' gradient. For example, the gradient may be selected to drive the comb 32 down into the litter 52 as quickly as possible without applying a force to the comb 32 with a horizontal component that the mechanism driving the comb 32 can not counteract. The v-plate 57 includes symmetric opposing faces to drive the comb 32 down into the litter 52 both as it travels away from the home position and as it travels back toward the home position. Advantageously, driving the comb 32 into the litter 52 as it travels in both directions may reduce the tendency of the litter 52 to migrate toward the disposal position over multiple sweep cycles. Additionally, the v-plate 57 may permit the comb 34 to be easily removed. The v-plate 57 may only obstruct the upward travel of the comb 34 over a small portion of the comb's range of travel. Thus, the v-plate 57 may permit the comb 34 to be lifted and removed from the automatic self cleaning litter box 10 without first removing the v-plate 57. For example, some embodiments may permit the comb 32 to be removed without first removing a privacy tent (see FIG. 14) or a ramp structure.

In some embodiments, alternate structures may be employed in place of or in combination with a v-plate 57. For instance, a groove or channel that is recessed into the upper housing 18 may direct the guide wheel 56. An embodiment employing a groove or channel may push the comb 32 down as it leaves the home position, hold the comb 32 down as it crosses the tray 12, and raise the comb 32 as it approaches the disposal position. In another embodiment, a sloped fin may extend from the inner side wall 20 of the upper housing to interface with the guide wheel 56. The sloped fin may include a bottom face that the guide wheel 56 rides down as the comb 32 travels away from the home position and an upper face the guide wheel 56 rides up and over in the return direction. In still another embodiment, the automatic self cleaning litter box 10 may employ some other device adapted to drive the comb 32 into the litter 52 as it travels in at least one direction. Alternatively, the v-plate 57 may be omitted entirely, and some other mechanism may ensure that the comb 32 penetrates the litter 52, such as a heavier comb, tines 34 that enter the litter 52 from a sharper angle relative to the surface of the litter 52, a spring or some resilient mechanism extending from the motor assembly 36 to the comb 32 that applies a downward force on the comb 32, or any other device adapted to pull or push the comb 32 downward. Regardless of the mechanism selected, the tines 34 preferably penetrate the litter 52 during a sweep to ensure that they remove any buried pet waste.

Other ramps may raise the comb 32 up out of the litter 52 at certain points in the sweep cycle. For example, the automatic self cleaning litter box 10 may include a disposal position ramp 58 to raise the comb 32 out of the litter 52 and allow it to push clumps 54 over the edge of the waste receptacle 28. Like the v-plate 57, the disposal position ramp 58 may feature a sloped surface with a gradient selected to generate a force on the comb 32 with a horizontal component that the mechanism driving the comb 32 can overcome. The disposal position ramp 58 may be integrated into the upper housing 18 as a single piece or it may be a separate component that attaches to the upper housing 18. However, because the disposal position ramp 58 widens as it approaches the base of the upper housing 18, it does not create issues with separation from the mold in an injection molding process and may be integrated into the upper housing 18 to reduce manufacturing costs. Like the v-plate 57, the disposal position ramp 58 may extend out from the inner wall 20 of the upper housing 18 far enough to engage the guide wheel 56 but not so far as to block the travel of the comb 32 and motor assembly 36. As an alternative to the disposal position ramp 58 of FIG. 4, the alternative structures discussed in reference to the v-plate 57 may be employed with appropriate modifications to raise the comb 32 rather than lower it. The disposal position ramp 58 may also include a sloped portion adapted to drop the comb 32 slightly near the point near the disposal position. Advantageously, by dropping the comb 32 slightly over the waste receptacle 28, loose clumps 54 may slide off the comb 32 and fall free. Thus, in some embodiments, the disposal position ramp 58 may position the comb 32 vertically over the waste receptacle 28 and shake loose clumps 54 that might otherwise adhere to the comb 32.

Figure 5:
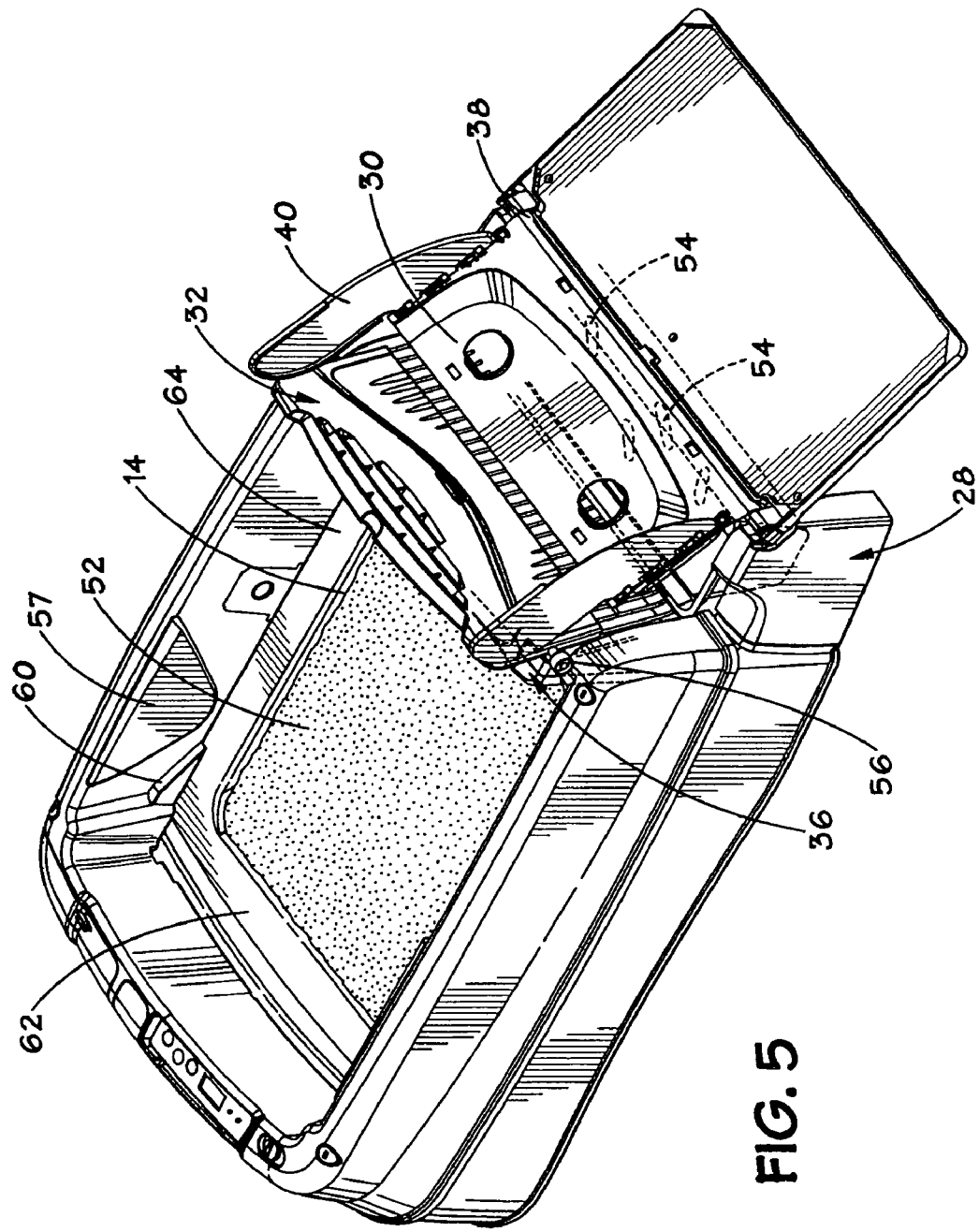
FIG. 5 is a perspective view of the automatic self cleaning litter box of FIG. 2 after a pet expelled waste with the comb near the disposal position in a sweep cycle.

FIG. 5 depicts the comb 32 in the disposal position to illustrate the operation of the comb 32, the disposal position ramp 58, and the cam arms 40. At this point in a sweep cycle, the comb 32 reaches the point of maximum travel, and the clumps 54 fall into the waste receptacle 28. The point of maximum travel may be selected to ensure that the comb 32 is fully over the waste receptacle 28 when it ceases to push the clumps 54 forward. As the comb 32 approaches the disposal position, the guide wheels 56 roll up the disposal position ramp 58 and raise the comb 32 to ensure the top edge of the waste receptacle 28 does not interfere with the comb's forward motion. As the guide wheels 56 lift the comb 32, it slides up the face of the motor assembly 36.

The comb 32 may raise the waste receptacle lid 30 as it approaches the disposal position by lifting the cam arms 40. As previously discussed, the waste receptacle lid 30 may include cam arms 40 extending out over the tray 12 to interface with the comb 32. The comb 32 may slide under these cam arms 40 and raise them as it moves forward and up the disposal position ramp 58. Preferably, the comb 32 does not pivot the waste receptacle lid 30 so far that the waste receptacle lid 30 and cam arm's center of gravity crosses the vertical plane intersecting the hinge 38 connecting them to the waste receptacle 28, otherwise the waste receptacle lid 30 may not fall closed when the comb 32 moves from the disposal position.

After the comb 32 reaches the position depicted in FIG. 5, the sequence of events depicted in FIGS. 3-5 are reversed, and the comb 32 returns to the home position. Once the comb 32 reaches the home position, the automatic self cleaning litter box 10 completes a sweep cycle. The comb 32 and motor assembly 36 may lie still until the next time a pet deposits waste, triggering a new sweep cycle.

In addition to depicting the comb 32 in the disposal position, FIG. 5 illustrates features of the automatic self cleaning litter box 10 that govern the position of the comb 32 while in the home position. As the comb 32 approaches the home position, a home position ramp 60 may lift the comb 32 out of the litter 52 to leave more of the litter 52 accessible for the pet to bury waste. The disposal position ramp 60 depicted in FIG. 5, like the v-plate 57 and the disposal position ramp 58, may include a sloped surface with a gradient selected by taking into account the amount of power available to drive the comb 32. The disposal position ramp 60 may extend high enough to raise the comb 32 completely out of the litter 52 to maximize the amount of litter 52 available for the pet to bury waste. Advantageously, lifting the comb 32 out of the litter 52 protects it from fresh pet waste that has not been absorbed or encased by litter 52. To reduce manufacturing costs, the disposal position ramp 60 may be integrated into the upper housing 18. Alternatively, the disposal position ramp 60 may be a separate component.

Also depicted in FIG. 5, the inner wall 14 of the tray 12 may be spaced inward relative to the inner wall 20 of the upper housing 18 to ensure that the comb 32 reaches most of the litter 52. In the rear portion of the tray 12, the inner wall 14 of the tray may be spaced inward to form a rear shelf 62, over which the motor assembly 36 may nest in the home position. The rear shelf 62 may be large enough to minimize the amount of litter 52 that the comb 32 fails to reach during a sweep cycle. However, the rear shelf 62 may be smaller or non existent, especially in embodiments where the comb 32 mounts to the rear of the motor assembly 36. In such a configuration, the motor assembly 36 would pull, rather than push, the comb 32 toward the waste receptacle 28. Along the sides of the tray 12, this inward spaced portion of the tray 12 may form a side shelf 64 on which the guide wheel 56 may roll, constraining the downward motion of the comb 32 and ensuring that the comb 32 reaches most of the litter 52. However, it should be noted that embodiments without this side shelf 64 may still be in accordance with the present techniques.

Turning to the electronic features of the automatic self cleaning litter box 10, FIG. 6 depicts the relationship of a microcontroller 66 to the various other electronic components that the exemplary automatic self cleaning litter box 10 may include. For example, the microcontroller 66 may receive power from a power supply 68, such as a transformer that plugs into a wall outlet. Alternately or in addition to the power supply 68, the microcontroller 66 may receive power from a battery pack 70. Advantageously, an automatic self cleaning litter box 10 with a battery pack 70 and a power supply 68 may continue to operate in the event of a power failure while not drawing down the batteries when power is available. As previously mentioned, the microcontroller 66 may also be coupled to an ionizer 72, the operation of which is described in greater detail in reference to FIG. 8. Alternatively, at the expense of potentially greater power consumption, the ionizer 72 may connect directly to the power supply 68 or battery pack for continuous operation. The pet sensor 44 may also connect to the microcontroller 66 to signal when a pet has entered the tray 12. The control panel 48 may act as an interface between the pet owner and the microcontroller 66. For example, through the control panel 48, the pet owner may instruct the microcontroller 66 to enter a sleep mode (described in greater detail in reference to FIG. 7), perform a sweep cycle, or pulse the ionizer 72.

Several of the components connected to the microcontroller 66 may cooperate to control the comb 32 during a sweep cycle. The microcontroller 66 may deliver power and receive feedback from an electric motor 74 that drives the motor assembly 36 and comb 32 along the length of the tray 12. The motor 74 may be an electric motor with sufficient power to drive the comb 32 through the deepest anticipated litter 52 fill level, such as an AC motor, a brushless DC motor, a servo motor, a brushed DC servo motor, a brushless AC servo motor, a stepper motor, or a linear motor, for example. The microcontroller 66 may receive feedback from the motor 74 by, for example, sensing the current drawn by the motor 74. In one embodiment, the microcontroller 66 may respond to a large current draw by the motor 74 by ceasing to drive the motor 74 forward and sounding an alarm to indicate that the comb 32 may be obstructed. In another embodiment, the microcontroller 66 may interpret a large current draw as indicating that the motor assembly 36 has reached the disposal position and reverse the direction of rotation of the motor 74 to return the motor assembly 36 to the home position. Similarly, a second large current draw may signal that the motor assembly 36 has returned to the home position. Additional or alternative feedback to indicate the position of the motor assembly 36 may come from a home position sensor 76 and a disposal position sensor 78 that are in communication with the microcontroller 66. As shown in greater detail in FIG. 9, at least one of these sensors 76-78 may be located near the home position and disposal position respectively. The sensors may be magnetic sensors, Hall effect sensors, mechanical switches, strain gauges, photovoltaic sensors, or any other sensor adapted to indicate the location of the motor assembly 36 or comb 32. The sensors may signal the microcontroller 66 when the motor assembly 36 has reached the home position or the disposal position through a change in voltage or current. In response, the microcontroller 66 may cease to deliver power to the electric motor 74 when the home position sensor 76 indicates the motor assembly 36 is in the home position. Similarly, the microcontroller 66 may reverse the direction of rotation of the motor 74 when the disposal position sensor 78 indicates that the motor assembly 36 is in the disposal position. Additionally, the microcontroller 66 may cease to drive the motor 74 and/or sound an alarm if either the home position sensor 76 or the disposal position sensor 78 does not indicate the presence of the motor assembly 36 within some duration of driving the motor assembly 36 toward the respective sensor.

The microcontroller 66 may be programmed to attempt to free an obstructed comb 32. For example, the microcontroller 66 may monitor the current drawn by the motor 74 for abrupt increases in current, indicating an obstructed comb 32. Should the microcontroller 66 determine that the comb 32 has become obstructed, it may take steps to free the comb 32. For example, the microcontroller 66 may reverse the motor's direction of rotation, driving the comb 32 back to the home position. The microcontroller 66 may then drive the comb forward, away from the home position, re-starting a sweep cycle. Should some object obstruct the comb 32 again, the microcontroller 66 may repeat the process, sending the comb 32 back to the home position and re-starting the sweep cycle. The microcontroller 66 may repeat this process a number of times, such as five, before ceasing operation and indicating with a visual or audio signal that the comb 32 is obstructed.

As indicated by FIG. 7, in some embodiments, the microcontroller 66 may direct the motor 74 through a sweep cycle under certain circumstances. For example, the microcontroller 66 may be programmed to enter a sleep mode whereby the automatic self cleaning litter box 10 remains silent or operates at a lower noise level for a period of time. The pet owner may instruct the microcontroller 66 to enter sleep mode through the control panel 48, or the automatic self cleaning litter box 10 may rely on environmental cues to trigger sleep mode, such as a light sensor to indicate that the pet owner has gone to sleep. To effectuate a sleep mode, the microcontroller 66 may be programmed to limit the noise from the automatic self cleaning litter box 10 by not engaging in a sweep cycle during the duration of sleep mode. As an alternative, the microcontroller 66 may be programmed to drive the comb 32 at a slower speed or less frequently during sleep mode to reduce noise. The duration of sleep mode may be fixed, such as for nine hours, or the pet owner may have the option of adjusting the time period. When exiting sleep mode, the microcontroller 66 may direct the motor 74 through a sweep cycle to remove any waste deposited while in sleep mode.

When not in sleep mode, the microcontroller 66 may direct the motor 74 through a sweep cycle in response to a signal from the pet sensor 44. The microcontroller 66 may be programmed to wait for a period of time, such as ten minutes, after the pet sensor 44 most recently indicated the presence of a pet in the tray to allow clumps 54 to form. Advantageously, by delaying for some period after the pet sensor 44 most recently indicated that a pet has left the tray 12, the automatic self cleaning litter box 10 may be less likely to frighten a pet by starting a sweep cycle when a pet re-enters the tray 12 within the delay period.

Figure 8:
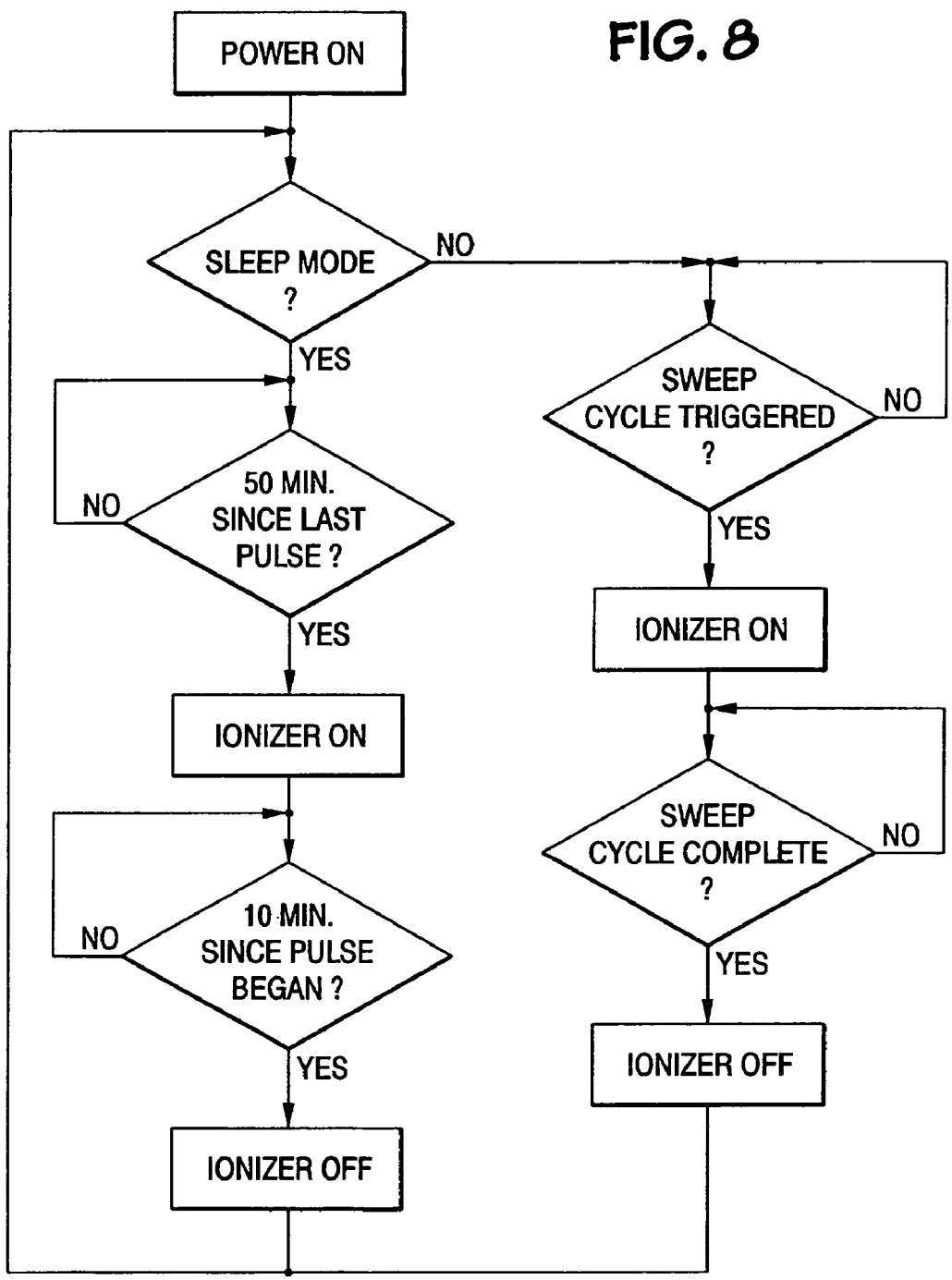
FIG. 8 is a flow chart illustrating the operation of the ionizer.

The microcontroller 66 of the present embodiment may control the operation of an ionizer 72 in a manner illustrated by FIG. 8. The ionizer 72 may operate periodically during sleep mode to reduce smells emitted by pet waste left in the tray 12. For example, the ionizer 72 may pulse periodically for some duration, such as ten minutes, during every hour. However, to further reduce the smell of pet waste and litter dust, the ionizer 72 may operate more frequently or even continuously during sleep mode. In some embodiments, pet owners may have control over the operation of the ionizer 72 through the control panel 48, allowing them to adjust the operation of the ionizer 72 to suit their personal tastes. In addition to operating during sleep mode, the ionizer 72 may operate for a period after the pet sensor 44 indicates a pet has entered the tray 12. For example, to reduce smells and dust when the litter 52 is agitated by the pet or comb 32, the ionizer 72 may operate from when the pet enters the tray 12 until the automatic self cleaning litter box 10 completes a sweep cycle. However, to further reduce the smell of pet waste and litter dust, the microcontroller 66 may operate the ionizer 72 for longer durations, more frequently, or even continuously.

Figure 9:
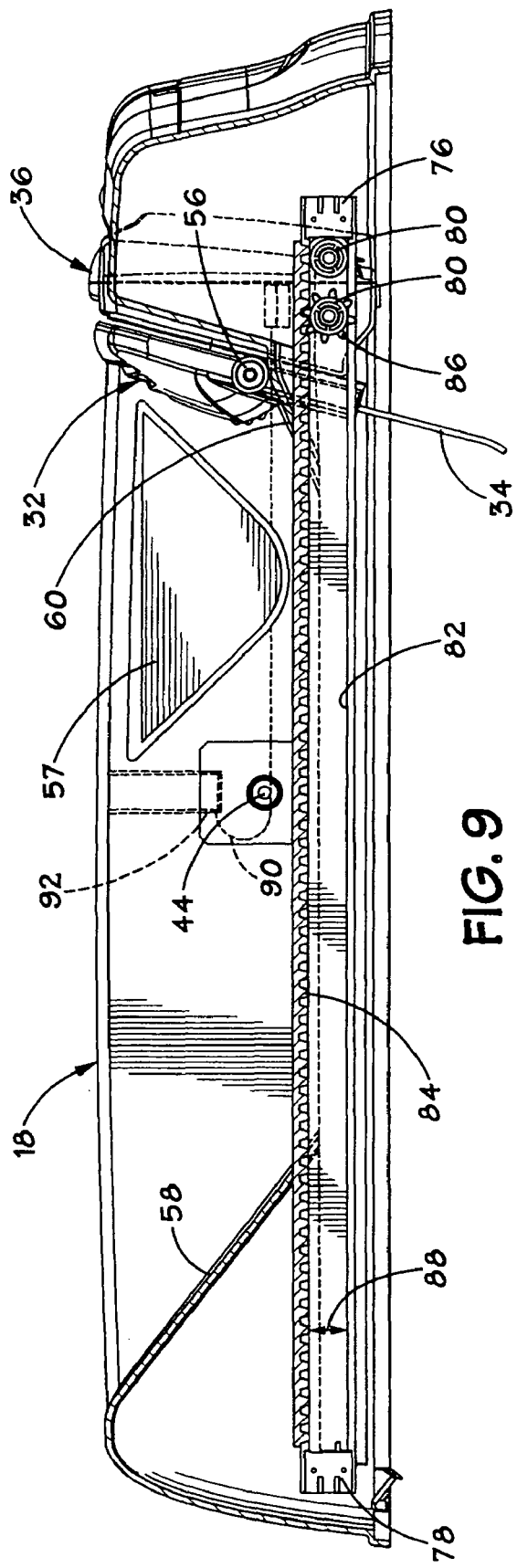
FIG. 9 is a cutaway side view of the automatic self cleaning litter box of FIG. 1, illustrating the inverted rack and pinion drive mechanism. To depict clearly the drive mechanism, the lower litter receptacle, outer sidewall of the upper litter receptacle, and waste receptacle assembly are not shown.

To display the components within the upper housing 18 that interface with the motor assembly 36, FIG. 9 depicts the automatic self cleaning litter box 10 of FIG. 3 from a cutaway view; in FIG. 9, the exterior wall of the upper housing 18, the waste receptacle 28, the tray 12, and the litter 52 are not shown. Support wheels 80 may roll on a support track 82, bearing the weight of the motor assembly 36 as it translates horizontally. The diameter of the support wheels 80 may be large enough to ride over any loose litter 52 that may reach the support track 82. Less preferably, some other mechanism, such as a support pin or sled, may bear the weight of the motor assembly 36 while sliding along the support track 82. A pair of support wheels 80 may constrain the motor assembly 36 to one degree of freedom relative to the support track 82, preventing the motor assembly 36 from rotating. However, other embodiments may employ more support wheels 80 to further distribute the load of the motor assembly 36 or fewer support wheels 80 in combination with other structures to prevent the motor assembly 36 from rotating. Still other embodiments may permit the motor assembly 36 to rotate while driving the comb 32 through the litter 52, in which case additional support structures may not be necessary. Preferably, the support track 82 is long enough so that the comb 32 may travel through the entire litter 52 carrying portion of the tray 12 and over the waste receptacle 28. The support track 82 may be affixed to the inward facing side of the exterior wall 22 of the upper housing 18, to the interior wall 20 of the upper housing, to the top surface of the tray 12, or other structures with appropriate dimensions. To leave some margin for a pet owner to overfill the tray 12, the support track 82 may be mounted high enough to ensure that the motor assembly 36 rides above the highest anticipated litter 52 fill level. Advantageously, this feature in combination with a floating comb 32 (e.g. slideably mounted to the motor assembly 36) may reduce the likelihood of excess litter 52 blocking the motor assembly 36, relieving pet owners of a situation that might otherwise require manual intervention.

Above the support track 82, the automatic self cleaning litter box 10 may include an inverted rack 84 that engages a pinion 86 driven by the motor assembly 36, permitting the motor assembly 36 to propel itself along the tray 12. The rack 84 may be inverted to prevent litter 52 from obstructing the pinion 86 as it engages the rack 84, as loose litter 52 particles may fall free from an inverted rack 84. However, other embodiments may employ a rack 84 mounted in a different orientation and a pinion 86 adapted to engage such a rack 84. The inverted rack 84 may include a series of teeth adapted to engage the pinion 86. The dimensions of the teeth may be selected with the size of litter particles in mind to ensure that litter particles are less likely to become wedged between the teeth. The height of the inverted rack 84 relative to the support track 82 may depend on the radius of the support wheels 80 and the pinion 86, as the support wheels 80 may hold the pinion 86 in position to engage the rack 84. The difference in height 88 may be slightly larger than or approximately equal to the sum of the radius of the support wheel 80 and the radius of the pinion 86 between its teeth. To hold this difference in height 88 to a tight tolerance, the support track 82 and rack 84 may be machined from a single piece of material or injection molded as a single component. However, less preferably, they may be manufactured as separate pieces or as part of the upper housing 18 or tray 12. While not depicted from the perspective of FIG. 9, the rack 84 may extend closer to the interior of the tray 12 than the support track 82 to allow one of the support wheels 80 and the pinion 86 to share an axle without the teeth of the pinion 86 interfering with the support track 82. As an alternative to the inverted rack 84 and pinion 86, the motor assembly 36 may drive itself by rotating the support wheel 80 against the support track 82, by rotating a drive wheel against a drive track adapted to generate sufficient friction, by rotating a spool to coil a pair of cables affixed to opposing ends of the tray 12, by rotating a threaded bushing on a screw drive, by rotating a screw drive coupled to a threaded bushing, or by any other mechanism that generates a force sufficient to drive the comb 32 through the litter 52.

A home position sensor 76 and a disposal position sensor 78 may reside at each end of the rack 84 to signal the microcontroller 66 when the motor assembly 36 has fully traversed the tray 12. The sensors may mount on the rack 84, on the tray 12, on the upper housing 18, or in any location that allows them to detect when the motor assembly 36 is proximate to their respective ends of the tray 12. The upper housing 18 may house the sensors to protect them from litter 52 and pet waste or they may attach to some other surface.

A ribbon cable 90 disposed within the upper housing 18 may deliver power to the motor assembly 36. The upper housing 18 may house the ribbon cable 90 to shield it from pet waste and litter 52, potentially reducing the number of components that may require cleaning. However, other embodiments may feature a ribbon cable 90 shielded by a structure separate from the upper housing 18, a ribbon cable 90 shielded by the tray 12, or a ribbon cable 90 without any shielding at all, for example. Advantageously, a ribbon cable 90 may be less likely to tangle or wear than other mechanisms for delivering power to the motor assembly 36 or comb 32. Nevertheless, those skilled in the art will appreciate that other devices may deliver power to the comb 32 or motor assembly 36, such as a screw drive coupled to a stationary motor assembly 36 that drives the comb 32 via a threaded bushing or a series of conductive tracks that deliver power to a mobile motor assembly 36 through conductive wheels. The ribbon cable 90 may extend from a fixed power 92 source within the upper housing 18 that communicates with the microcontroller 66, power supply 68, batteries 70, or any other source of power. The length of the ribbon cable 90 may be sufficient to deliver power to the motor assembly 36 throughout an entire sweep cycle. To reduce the length of the ribbon cable 90 while still delivering power to the motor assembly 36 throughout its entire range of motion, the fixed power source 92 may reside near halfway between the home position and the disposal position. However, other embodiments may employ a longer ribbon cable 90 with a fixed power source 92 in a different location. The ribbon cable 90 may include separate power busses for the ionizer 72, the motor 74, and any other electronic device within the power assembly. Additionally, the ribbon cable 90 may include command or feedback busses by which electronic components in the motor assembly 36 may communicate with the microcontroller 66.

Figure 10:
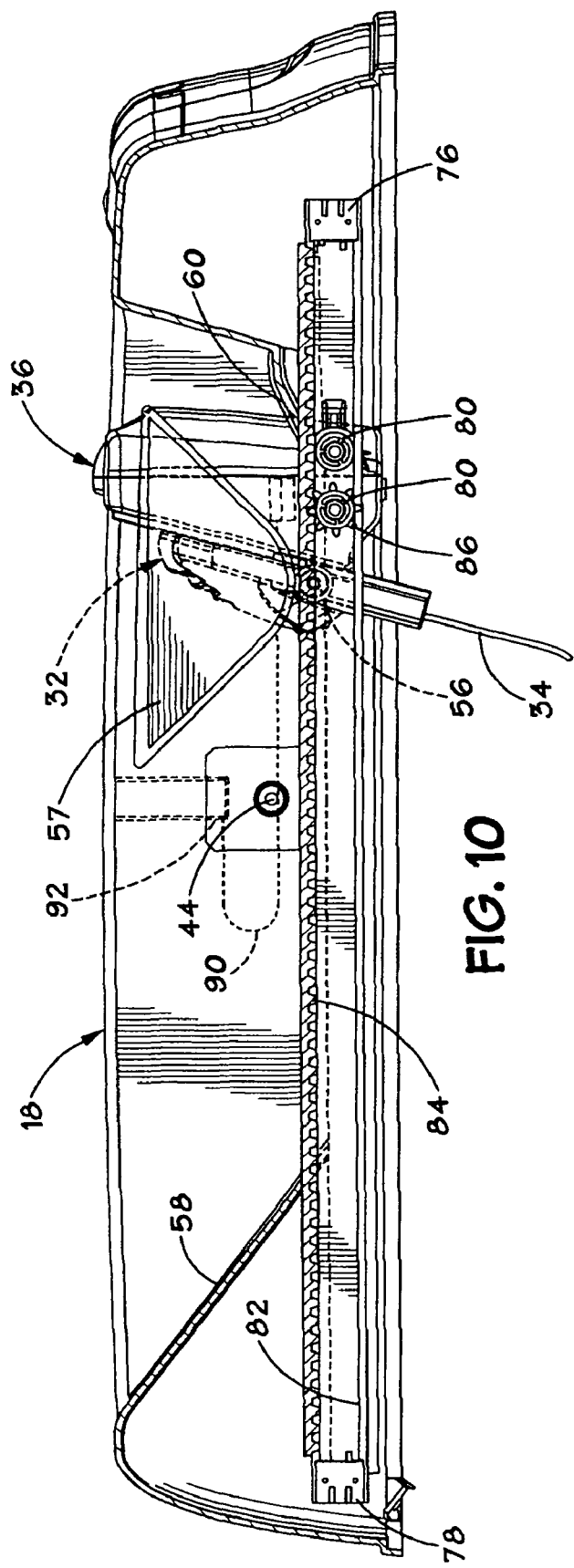
FIG. 10 is the cutaway side view of FIG. 9 with the comb in the position depicted in FIG. 4.
Figure 11:
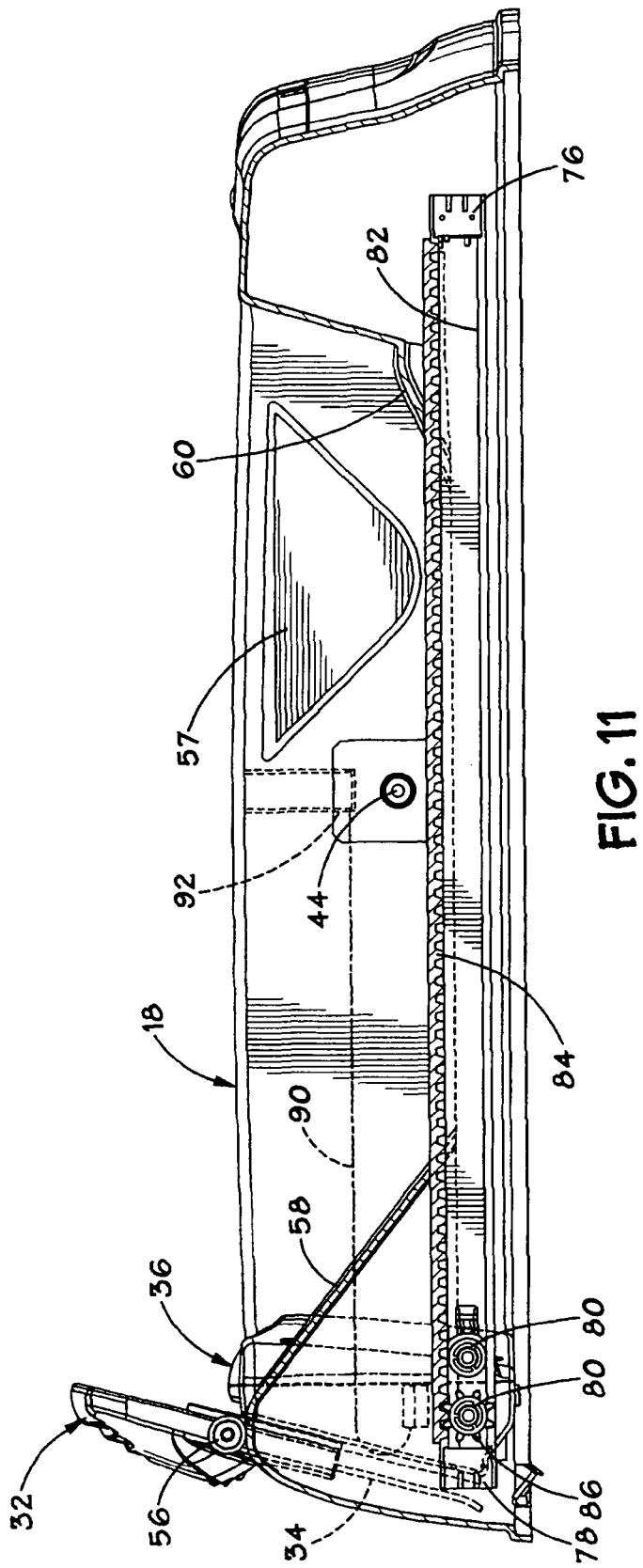
FIG. 11 is the cutaway side view of FIG. 9 with the comb in the position depicted in FIG. 5.

To illustrate the movement of the comb 32 relative to the motor assembly 36 more clearly, FIGS. 9-11 depict the comb 32 at various stages of a sweep cycle from a side view. Starting with the comb 32 in the home position, FIG. 9 depicts the guide wheel 56 resting on the home position ramp 60 and elevating the comb 32. Next, FIG. 10 depicts comb 32 at an intermediate point in a sweep cycle. As it moves from the home position, the comb 32 slides down the face of the motor assembly 36, helped by the guide wheel 56 rolling down the v-plate 57. The comb 32 may slide at an angle relative to the vertical to drive the tines 34 into the litter 52 at a non-normal angle. By leading with the tips of the tines 34 while sifting the litter 52, clumps 54 buried in the litter 52 may tend to rise to the surface for easier transport and disposal. Additionally, the tips of the tines 34 of the comb 32 may deviate toward the disposal position from the plane in which the comb 32 slides to enhance this effect. Finally, FIG. 11 depicts the comb 32 near the disposal position. As the motor assembly 36 pushes the comb 32 forward, the guide wheels 56 may ride up the disposal position ramp 58 and elevate the comb 32. Preferably, the comb 32 elevates high enough that the tines 34 may pass over the edge of the waste receptacle 28 (not shown).

Figure 12:
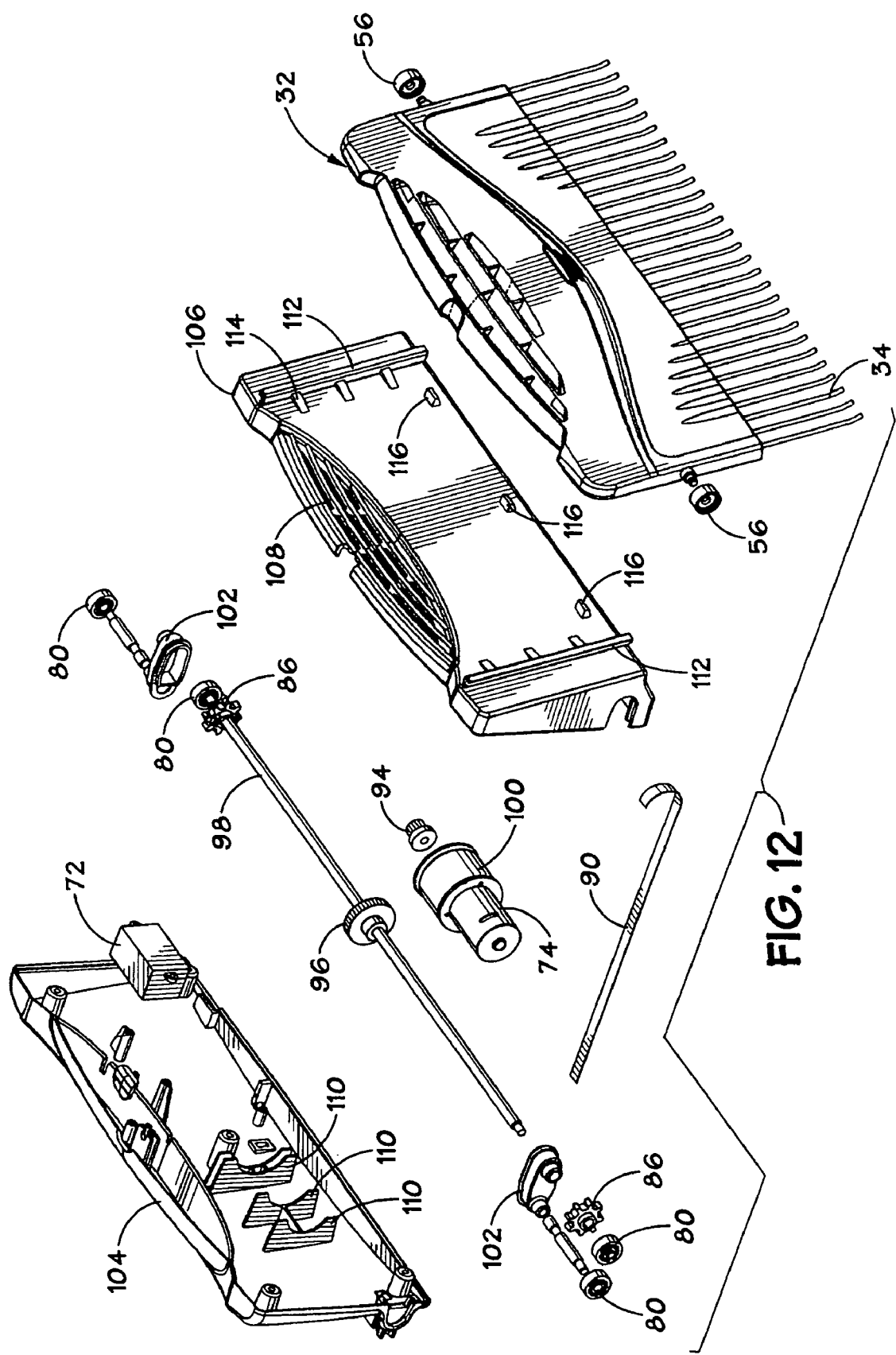
FIG. 12 is an exploded perspective view of the motor assembly and the comb.

Turning to the comb 32 and motor assembly 36, FIG. 12 depicts an exploded perspective view to explain their operation in more detail. Starting with the components directed toward driving the motor assembly 36, the motor assembly 36 may include an electric motor 74 to propel the comb 32 through the tray 12. The electric motor 74 may drive a master gear 94 in meshed engagement with a slave gear 96. The gear ratio of the slave gear 96 and master gear 94 may be such that it magnifies the torque produced by the electric motor 74. The slave gear 96 may propel a drive shaft 98 that extends out each side of the motor assembly 36. Alternatively, the electric motor 74 may communicate with the drive shaft 98 directly, through a belt, worm gear, harmonic drive, chain and sprocket, or other device adapted to transfer mechanical energy between rotating shafts. To provide additional torque, the motor 74 may include another reducing transmission to turn the master gear 94, such as an integrated gearbox 100. To avoid creating a moment about a vertical axis with respect to the motor assembly 36, the drive shaft 98 may extend to support tracks 82 and inverted racks 84 symmetrically disposed on each side of tray 12. For similar reasons, the home position ramp 60, v-plate 57, disposal position ramp 58, and guide wheels 56 may be symmetrically disposed as well. As previously explained, pinions 86 disposed about each end of the drive shaft 98 may cooperate with the racks 84 to translate the torque carried by the drive shaft 98 into a horizontal force. To reduce the number of components, the drive shaft 98 may also act as an axle for one pair of support wheels 80 that sit adjacent the pinions 86. Bushings 102 may support the drive shaft 98 and keep litter 52 out of the motor assembly 36. In the embodiment of FIG. 12, the bushing 102 supporting the drive shaft 98 may be integrated with the bushing 102 that supports a support shaft, about which the other support wheel 80 rotates. However, less preferably, the bushings may be separate components.

Also included in the exemplary motor assembly 36 of FIG. 12, an ionizer 72 may reduce airborne irritants, such as litter dust and the smell of pet waste. An ionizer may be one example of an active air freshener. Other examples of active air fresheners may be employed instead of an ionizer or in combination with an ionizer, such as an ozone generator, deodorant sprayer, a passive air filter (e.g. a carbon filter) combined with a fan to drive air through the filter, or other device which actively freshens the air. To clean the air, the ionizer 72 may employ an electric potential to ionize the air. Once ionized, the air attracts particles that might otherwise irritate pet owners as a source of smell or dust. The particles attracted to the ionized air may aggregate and settle out of the air into the tray 12. Thus, advantageously, the present embodiment may relieve pet owners of some smells and dust that would otherwise disperse throughout their residence.

The motor assembly 36 may include a rear face 104 and a front face 106 to house these components. The rear face 104 may affix to the front face 106 with any mechanism adapted for joining two plastic components, such as screws, fused plastic, glue, or resilient clips, for example. Alternatively, the front face 106 and rear face 104 may be manufactured from a single piece of plastic. The front face 106 and the rear face 104 may include vents 108 to facilitate airflow to the ionizer 72 and cool the motor 74. The vent 108 openings may be small enough that loose litter 52 particles can not enter the interior of the motor assembly 36. The front face 106 and rear face 104 may include structures to support the motor 74, such as a series of fins 110 shaped to embrace the motor 74 when the front face 106 is secured to the rear face 104.

The front face 106 may include additional features to direct the movement of the comb 32. For example, vertical guide members 112 may slideably interlock with complementary structures on the comb 32, as depicted in more detail in FIG. 13. The vertical guide members 112 may be integrated as a single piece with front face 106 of the motor assembly 36 to reduce manufacturing costs. However, in other embodiments, they may be separate components attached to the front face 106. The front face 106 may employ a pair of symmetrically disposed vertical guide members 112 to distribute forces transmitted to the comb 32 over more area, reducing friction that may inhibit the comb's sliding. However, other embodiments may rely on a single vertical guide member 112 that is appropriately shaped to constrain the comb's movement. Still other embodiments may include three or more vertical guide members 112 to further distribute the forces further applied to the comb 32. Some embodiments in accordance with the present technique may employ multiple vertical guide members 112 with a comb 32 split into multiple segments to accommodate uneven litter 52 distribution. Indeed, one embodiment may allow each individual tine to translate vertically independently of any of the other tines 34. Such an embodiment may feature cavities in the motor assembly 36 or comb 32 to receive each tine and a resilient member or weight associated with each tine to drive it into the litter 52. In the embodiment of FIG. 12, the length of the vertical guide members 112 may be selected to ensure that the comb 32 stays aligned throughout its entire vertical range of travel. Supports 114 may enhance the strength of the vertical guide members 112. To reduce material costs, multiple individual supports 114 may be employed. However, to add strength, some embodiments may include one large support 114 for each vertical guide members 112 or a single support 114 that spans between a pair of vertical guide member. To prevent the tines 34 from scraping the tray 12, the front face 106 may include a series of slide stops 116. The slide stops 116 may be placed to prevent the comb 32 from sliding into the tray 12. As with the vertical guide members 112, the slide stops 116 and the supports 114 are preferably integrated into the front face 106, but they may be manufactured separately and affixed to the front face 106.

Figure 13:
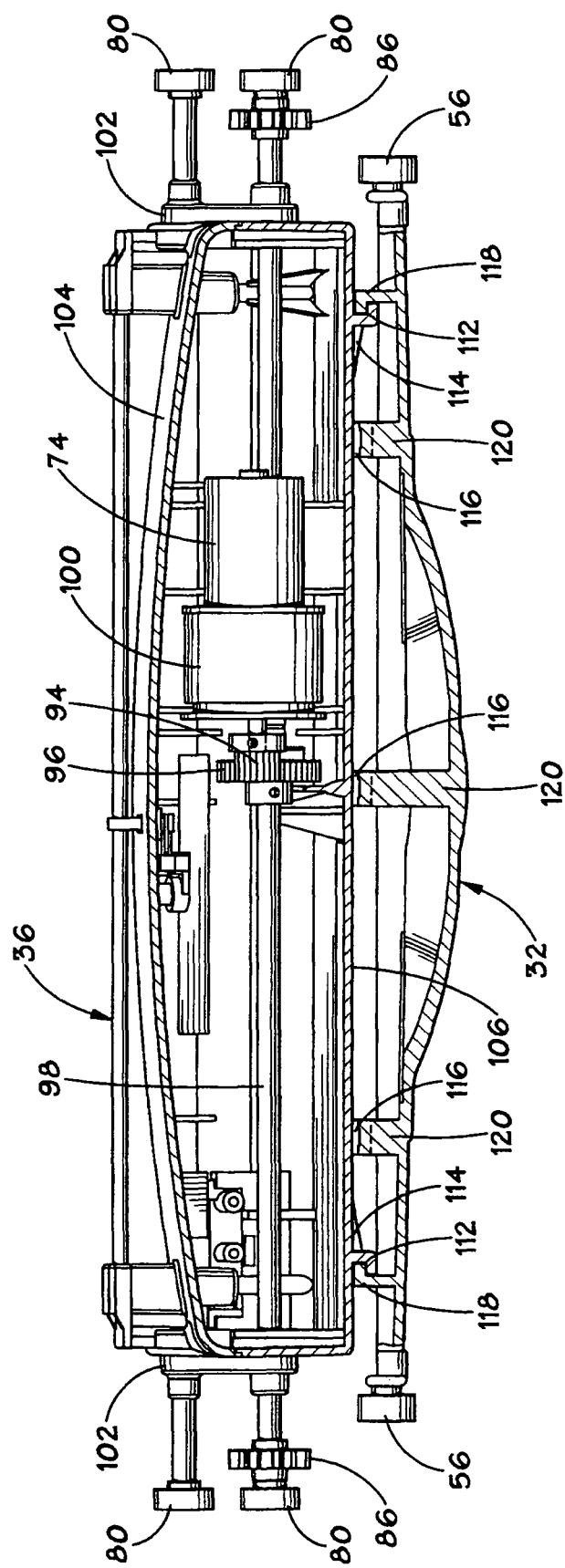
FIG. 13 is a cross-sectional view of the motor assembly and the comb from a perspective orthogonal to that of FIG. 9.

The comb 32 may include various structures to interface with the front face 106 of the motor assembly 36. To display these structures, FIG. 13 offers a cross-sectional view of the comb 32 mounted on the motor assembly 36 from an overhead perspective. The comb 32 may include vertical slide rails 118 to engage the vertical guide members 112 on the front face 106. As depicted in FIG. 13, these components may slideably interplay to constrain the comb 32 to one degree of freedom relative to the motor assembly 36. In the embodiment of FIG. 13, the vertical guide members 112 may have an L-shaped cross-section with distal ends directed away from one another. Overlapping the vertical guide members 112, the vertical slide rails 118 may have an L-shaped cross section with a distal ends directed toward one another. However, it should be appreciated that other embodiments may feature intermeshing vertical guide rails and vertical guide members 112 with other cross-sectional profiles that leave the comb 32 to move with one degree of freedom relative to the motor assembly 36. To reduce sliding friction, some embodiments may employ a bearing between the vertical guide member and the vertical guide rail.

A series of support columns 120 may strengthen the comb 32 and receive a portion of the horizontal driving force applied to the comb 32 by the motor assembly 36. A side of the support columns 120 may lie flush with the front face 106 of the motor assembly 36 to spread the load applied to the comb 32 and reduce sliding friction. Other embodiments may further distribute these forces by employing more than three support columns 120. To further reduce sliding friction, some embodiments may employ a bearing at the interface between the support column 120 and the front face 106. The support columns 120 may be integrated into the comb body or they may be manufactured separately and affixed to the comb 32. The support columns 120 may be distributed across the width of the comb 32 so as to interfere with the slide stops 116, thus limiting the travel of the comb 32. However, it should be noted that some embodiments may employ structures other than the support columns 120 to limit the travel of the comb 32, such as separate structures that engage the slide stops 116 or tines 34 that contact the bottom of the tray 12, for example.

The present embodiment may present two benefits to pet owners. First, a comb 32 that slides, or floats, on the motor assembly 36 may offer increased tolerance of an overfilled tray 12. Coupled with such a comb 32, the motor assembly 36 may ride higher above the tray 12 as the comb 32 slides down into the litter 52. Thus, excess litter 52 may be less likely to obstruct the motor assembly 36. At the same time, the comb 32 may float over excess litter 52 rather than becoming obstructed. While the v-plate 57 may initially drive the comb 32 down into the litter 52, if the comb 32 is immersed too far into the litter 52 and the resistance to forward motion high enough, it may simply slide back up the slightly angled front face 106 of the motor assembly 36. Thus, the excess litter 52 may be less likely to obstruct the comb 32 and motor assembly 36. Second, the comb 32 may be removed for cleaning relatively effortlessly, without the use of tools. To remove the comb 32, the pet owner may slide the comb 32 out of engagement with the motor assembly 36 by lifting the comb 32 away from the tray 12. Then, after cleaning, the pet owner reattaches the comb 32 by merely sliding it back into position. Thus, the pet owner spends little time or effort proximate to any pet waste that may reside in the tray 12. However, it should be noted that other embodiments in accordance with the present techniques may offer only one, both, or neither of these advantages.

Figure 14:
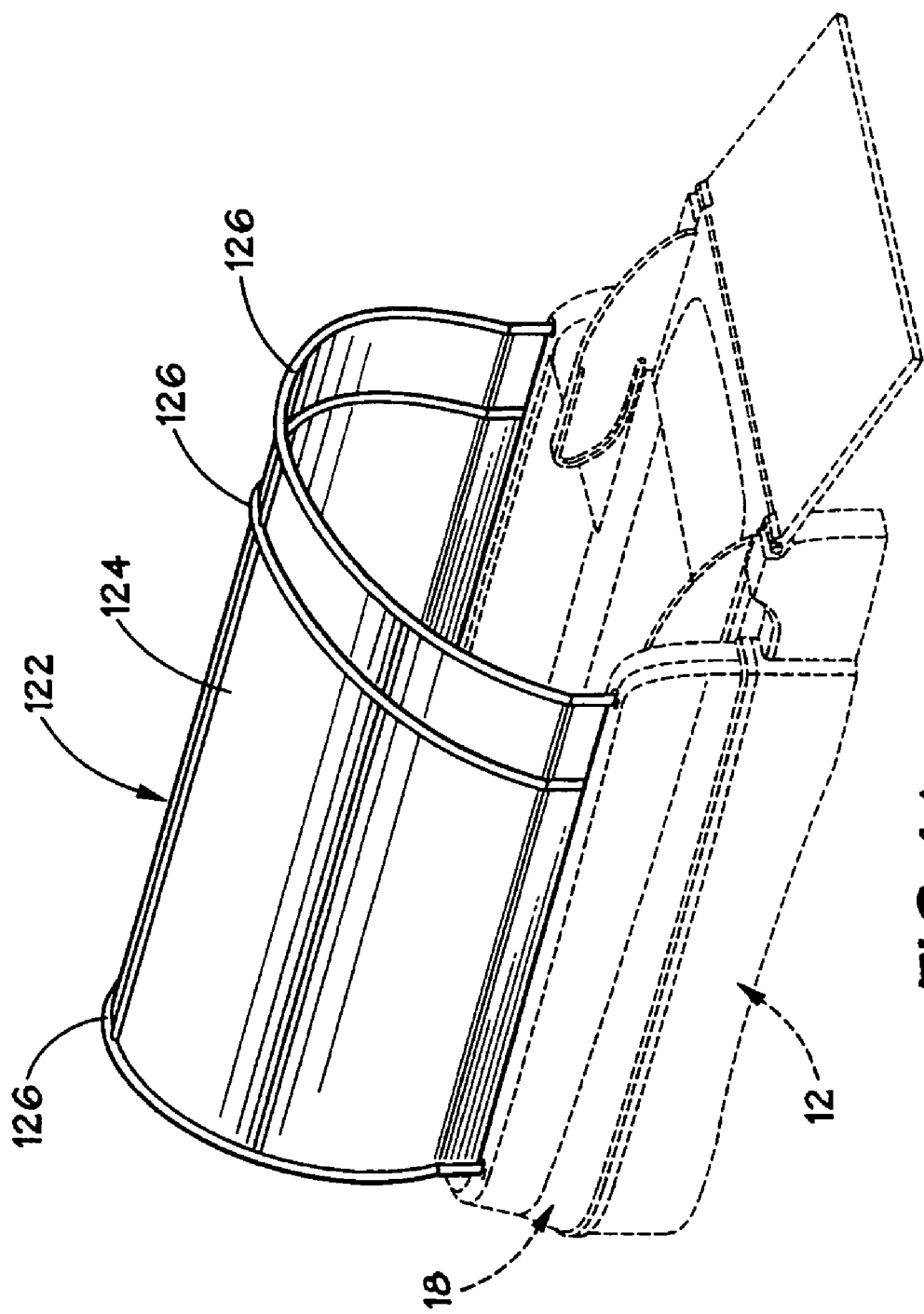
FIG. 14 is a perspective view of an integrated tent attached to the automatic self cleaning litter box of FIG. 1.
Figure 15:
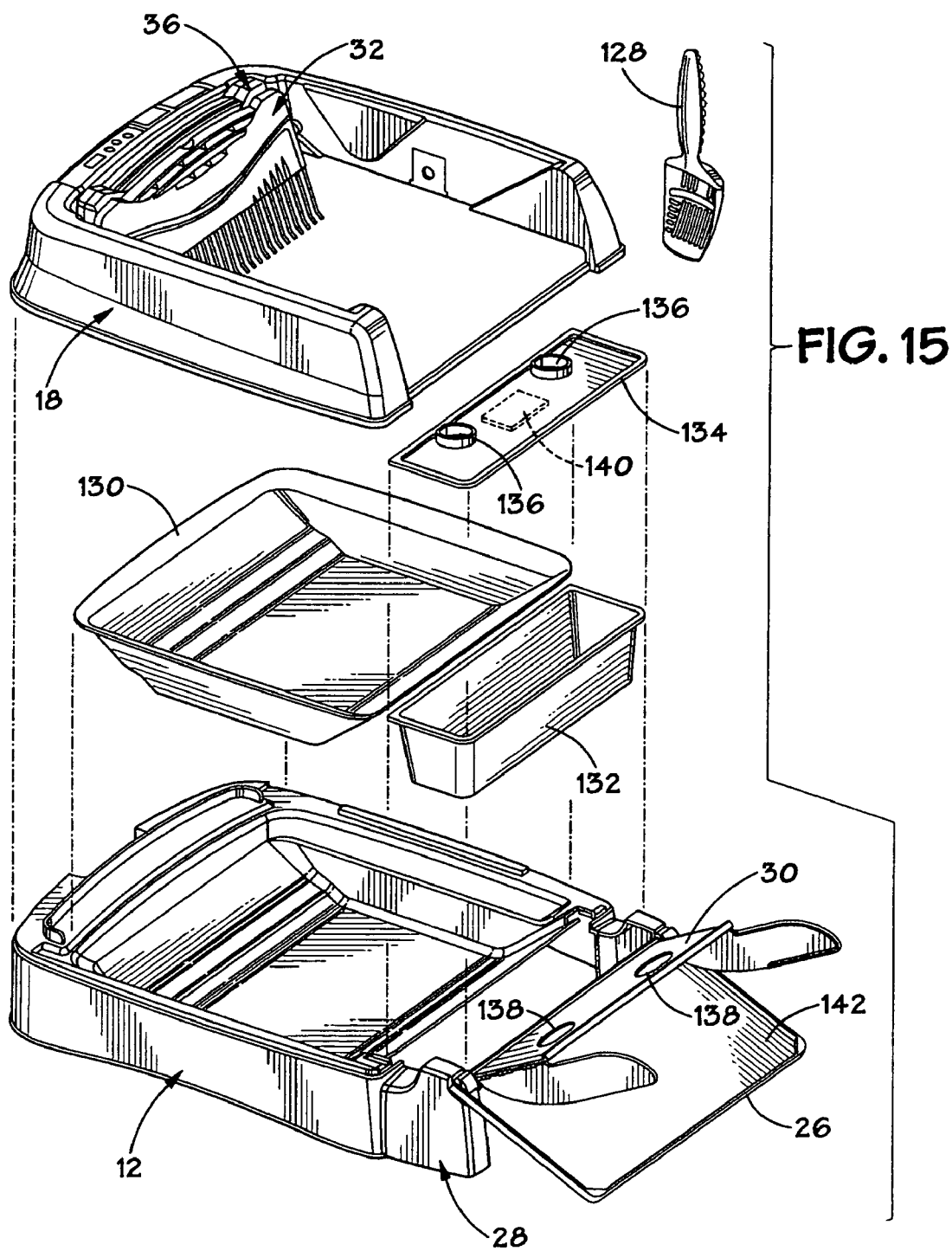
FIG. 15 is an exploded perspective view of an automatic self cleaning litter box with a tray liner, waste receptacle liner, air filter, ramp carpet, and a manual litter scoop.

An automatic self cleaning litter box 10 in accordance with the present techniques may include various additional features to further reduce the burden of dealing with pet waste. FIGS. 14-15 illustrate exemplary components that may be offered with such an automatic self cleaning litter box 10. For example, FIG. 14 illustrates an integrated privacy tent 122 that may offer privacy to a pet while confining litter 52 and pet waste to the tray 12. The integrated privacy tent 122 may include a shield 124 to cover the tray 12. The shield 124 may extend far enough above the tray 12 that a pet can comfortably enter the tray 12 to deposit waste. The shield 124 may be formed from fabric, plastic, metal, a composite, or any other material that can be formed in sheets. Tent rods 126 may support the shield 124. The tent rods 126 may be substantially straight in an unbiased state and sufficiently resilient to flex into a semicircular shape when affixed to the automatic self cleaning litter box 10. However, other embodiments may employ a more rigid tent rod 126 that assumes a more semicircular shape in an unbiased state or no tent rods 126 at all. The tent rods 126 may be integrated into the shield 124 as a single piece of material or they may attach to the shield 124 through, for example, loops extending from the shield 124. The upper housing 18 may include recesses to receive the tent rods 126. To stabilize the integrated privacy tent 122, the recesses may be distributed at each corner of the upper housing 18.

The automatic self cleaning litter box 10 may include additional components directed toward making it easier to clean. As depicted in FIG. 15, the automatic self cleaning litter box 10 may include a manual litter scoop 128 to remove pet waste without employing the comb 32. Additionally, to protect the surface of the tray 12, the automatic self cleaning litter box 10 may include a tray liner 130. The tray liner 130 may conform to the shape of the tray 12 so as to not interfere with the movement of the comb 32. Advantageously, rather than clean the tray 12 by hand, some pet owners may simply discard the disposable tray liner 130 and replace it with a new one. Similarly, as previously discussed, the waste receptacle 28 may include a waste receptacle liner 132 to aggregate pet waste scooped from the tray 12. The waste receptacle liner 132 may conform to the shape of the waste receptacle 28 to ensure it is securely positioned under the comb 32 in the disposal position. The waste receptacle liner 132 may be made of vacuum formed plastic to reduce manufacturing costs, as some pet owners may treat it as disposable if it is inexpensive. The waste receptacle liner 132 may removable couple to a waste receptacle liner lid 134 to enclose pet waste even when the waste receptacle liner 132 is removed from the waste receptacle 28. The waste receptacle liner lid 134 may include substantially cylindrical protrusions 136 with a compressible expanded portion at the tip to interlock with the waste receptacle lid 30. Similarly, the waste receptacle lid 30 may include apertures 138 to receive these protrusions 136. The apertures 138 may be generally circular with a diameter slightly smaller than the expanded portion of the protrusion 136 to lock the waste receptacle liner lid 134 in place. Thus, to dispose of the waste receptacle liner 132 without being exposed to pet waste, the pet owner may merely press down on the protrusions 136 to disengage them from the waste receptacle lid 30. Then, while the waste receptacle liner lid 134 is still in place on the waste receptacle liner 132, they may pivot the waste receptacle lid 30 out of the way and remove the waste receptacle liner 132 for disposal.

To further reduce the smell of pet waste, an air filter 140 may attach to the interior of the waste receptacle liner lid 134. The air filter 140 may include activated carbon, zeolite, alumina potassium permanganate, or any other material capable of mitigating the smell of pet waste. The air filter 140 may permanently attach to the waste receptacle liner lid 134 to keep it proximate to the pet waste and ensure that it is disposed of with the waste receptacle liner lid 134. Alternatively, the air filter 140 may include an adhesive portion or some other attachment mechanism, so pet owners may attach and replace an air filter when they feel necessary. It should also be noted that the air filter 140 may reside outside the waste receptacle liner 132 as long as it is close enough to the automatic self cleaning litter box 10 to absorb odor.

A ramp carpet 142 may cover the ramp 26 to clean a pet's paws as they exit the litter box. The ramp carpet 142 may have similar dimensions as the ramp 26 or it may extend beyond the ramp 26, covering the waste receptacle lid 30, for example. The ramp carpet 142 may include fibers of nylon, polyester, polypropylene, wool, or any other fiber that may remove litter 52 from the pet's paws. Alternatively, the ramp carpet may include an array of protrusions or apertures adapted to entrain litter from a pet's paws. Advantageously, by removing litter 52 from a pet's paws, the ramp carpet 142 may reduce the spread of litter 52 beyond the tray 12.

Figure 16:
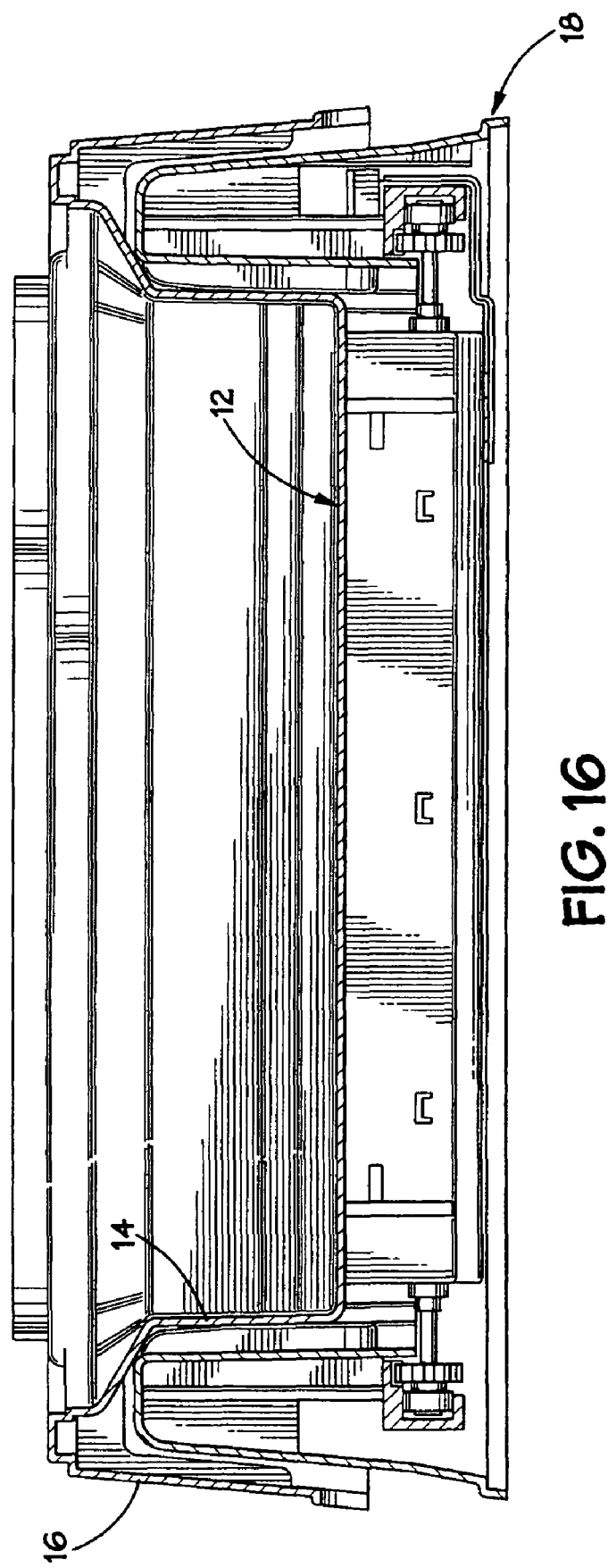
FIG. 16 is a cross-sectional view of an automatic self cleaning litter box with the tray nested over the upper housing prior to assembly.

To reduce packaging volume, certain embodiments in accordance with the present technique may include a tray 12 shaped such that, prior to assembly, it nests above the upper housing 18. For example, the bottom surface of the tray 12 may be shaped to partially surround the upper housing 18 if lowered onto the upper housing 18. FIG. 16 depicts a cross section of such an embodiment prior to assembly with the upper housing 18 nesting under the tray 12. The upper housing 18 and motor assembly 36 may fit within the space defined by the tray interior walls 14 and the tray exterior walls 16. Thus, to assembly the automatic self cleaning litter box 10, the pet owner may lift the tray 12 off the upper housing 18 and place the upper housing 18 on top of the tray 12, reversing their order of stacking.

While the invention may be susceptible to various modifications and alternative forms, specific embodiments have been shown by way of example in the drawings and are described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus, comprising:
   a litter receptacle;
   a drive unit moveably coupled to the litter receptacle, the drive unit comprising a motor; and
   a sieve slidably coupled to the motor of the drive unit, wherein the sieve is slidably coupled to the motor for linear movement relative thereto and for at least two degrees of freedom of movement relative to the litter receptacle.

2. The apparatus of claim 1, comprising at least one of the following:
   litter, a ramp carpet, a privacy tent, an air filter, a litter receptacle liner, a waste receptacle liner, an ionizer, or a manual litter scoop.

3. The apparatus of claim 1, wherein the sieve is slidably coupled to the motor with two degrees of freedom of movement relative to the litter receptacle.

4. The apparatus of claim 1, wherein the drive unit is coupled to the litter receptacle via a rack and a pinion.

5. The apparatus of claim 4, comprising:
a guide wheel attached to the sieve; and
a ramp coupled to the litter receptacle such that the ramp interacts with the guide wheel to move the sieve receptacle to the drive unit as the drive unit moves relative to the litter receptable.

6. The apparatus of claim 1, wherein the motor is configured to move the drive unit along the litter receptacle.

7. The apparatus of claim 1, wherein the sieve is further removeably coupled to the motor.

8. An apparatus, comprising:
a litter receptacle with a first interior side and a second interior side that are substantially parallel to a direction of travel, the litter receptacle further having a first region and a second region positioned along the direction of travel;
a drive unit coupled to the litter receptacle, the drive unit having a motor and a sieve wherein the drive unit is configured to apply a driving force to the sieve in the direction of travel and is configured to apply a reactive force to the litter receptacle that opposes the driving force applied to the sieve, wherein the reactive force is applied to the litter receptacle at the first region and a second region,
the sieve slidably coupled to the motor of the drive unit, wherein the sieve is slidably coupled to the motor for linear movement relative thereto and for at least two degrees of freedom of movement relative to the litter receptacle;
a first ramp attached to the first interior side of the litter receptacle; and
a second ramp that is substantially parallel to the first ramp and that is attached to the second interior side of the litter receptacle, wherein the second ramp is a distance away from the first ramp that is less than a component of a vector between the first region and the second region that is perpendicular to the direction of travel.

9. The apparatus of claim 8, comprising a guide wheel coupled to the sieve and configured to interface with one of the first ramp and the second ramp.

10. The apparatus of claim 8, wherein the litter receptacle comprises a first rack and a second rack that are configured to receive the reactive force.

11. The apparatus of claim 8, wherein the sieve is further removeably coupled to the motor.

12. An apparatus comprising:
a litter receptacle;
a drive unit coupled to the litter receptacle, the drive unit comprising a motor;
a sieve slidably coupled to the drive unit, wherein the sieve is slidably coupled to the motor of the drive unit for linear movement relative thereto and for at least two degrees of freedom of movement relative to the litter receptacle; and
a sleep timer configured to reduce noise emitted by the drive unit and the litter receptacle for a period of time of at least 5 hours, automatically perform a sweep cycle at the end of the period of time, and energize an ionizer during the period of time.

13. The apparatus of claim 12, wherein the sleep timer is configured to reduce the noise emitted by the drive unit and the litter receptacle by not automatically performing a sweep cycle during the period of time.

14. The apparatus of claim 12, wherein the sleep timer is configured to periodically energize the ionizer during the period of time.

15. The apparatus of claim 14, wherein the sleep timer is configured to energize the ionizer for 10 minutes of every hour during the period of time.

16. The apparatus of claim 12, wherein the sleep timer is configured to receive a command from a user instructing the sleep timer to reduce the noise emitted by the drive unit and the litter receptacle for a period of time.

17. The apparatus of claim 12, wherein the sieve is further removeably coupled to the motor.

18. An apparatus, comprising:
a litter receptacle;
a drive unit moveably coupled to the litter receptacle, the drive unit comprising a motor and a front face and a rear face, the front face having a guide member extending outward therefrom;
a sieve slidably coupled to the motor of the drive unit, wherein the sieve is slidably coupled the motor for linear movement relative thereto and for at least two degrees of freedom of movement relative to the litter receptacle; and
a ribbon cable attached to the drive unit and the litter receptacle.

19. The apparatus of claim 18, wherein the sieve is coupled to the motor such that the sieve can be removed without the use of tools.

20. The apparatus of claim 18, comprising at least one of the following: litter, a ramp carpet, a privacy tent, an air filter, a litter receptacle liner, a waste receptacle liner, an ionizer, or a manual litter scoop.

21. The apparatus of claim 18, wherein the sieve is further removeably coupled to the motor.

22. An apparatus comprising:
a litter receptacle;
a drive unit moveably coupled to the litter receptacle, the drive unit comprising a motor and a front face and a rear face, the front face having a guide member extending outward therefrom;
a sieve slidably coupled to the motor of the drive unit, wherein the sieve is slidably coupled to the motor for linear movement relative thereto and for at least two degrees of freedom of movement relative to the litter receptacle; and
an active air freshener coupled to the litter receptacle via the drive unit.

23. The apparatus of claim 22, wherein the active air freshener comprises an ionizer.

24. The apparatus of claim 22, comprising a ribbon cable that is communicatively coupled to the active air freshener.

25. The apparatus of claim 22, comprising at least one of the following: litter, a ramp carpet, a privacy tent, an air filter, a litter receptacle liner, a waste receptacle liner, or a manual litter scoop.

26. The apparatus of claim 22, wherein the sieve is further removeably coupled to the motor.

27. A method of manufacturing an automatic self cleaning litter box, comprising:
providing a litter receptacle;
providing a drive unit adapted to be moveably coupled to the litter receptacle, the drive unit comprising a motor; and
providing a sieve adapted to be slidably coupled to the motor of the drive unit such that the sieve is slidably coupled to the motor for linear movement thereto and for at least two degrees of freedom of movement relative to the litter receptacle.

28. The method of claim 27, wherein the step of providing a sieve comprises providing a sieve that is adapted to be coupled to the coupling member such that the sieve is toollessly removable.

29. The method of claim 27, comprising:
providing a rack adapted to be affixed to the litter receptacle; and
providing a pinion adapted to be coupled to the drive unit.

30. The method of claim 27, further comprising providing at least one of the following: litter, a ramp carpet, a privacy tent, an air filter, a litter receptacle liner, a waste receptacle liner, an ionizer, or a manual litter scoop.

31. The method of claim 27, wherein the motor is configured to move the drive unit along the litter receptacle.

32. The method of claim 27, wherein the sieve is further adapted to be removeably coupled to the motor.

33. A method of manufacturing an automatic self cleaning litter box, comprising:
providing a litter receptacle;
providing a drive unit comprising a motor and a front face and a rear face, the front face having a guide member extending outward therefrom;
providing a sieve slidably coupled to the motor of the drive unit, wherein the sieve is slidably coupled to the motor for linear movement thereto and for at least two degrees of freedom of movement relative to the litter receptacle; and
providing an ionizer adapted to be affixed to the drive unit.

34. The method of claim 33, wherein the drive unit is adapted to be moveably coupled to the litter receptacle.

35. The method of claim 33, comprising providing a microcontroller.

36. The method of claim 33, wherein the drive unit is vented.

37. The method of claim 33, further comprising providing at least one of the following: litter, a ramp carpet, a privacy tent, an air filter, a litter receptacle liner, a waste receptacle liner, or a manual litter scoop.

38. A method of manufacturing an automatic self cleaning litter box, comprising:
providing a litter receptacle including a power supply;
providing a drive unit including an electric motor, wherein the drive unit is adapted to be moveably coupled to the litter receptacle;
providing a sieve adapted to be slidably coupled to the electric motor, wherein the sieve is slidably coupled to the electric motor for linear movement thereto and for at least two degrees of freedom of movement relative to the litter receptacle; and
providing a ribbon cable adapted to place the electric motor and the power supply in electrical communication.

39. The method of claim 38, wherein the drive unit is adapted to be coupled to the litter receptacle through a rack and a pinion.

40. The method of claim 38, wherein the litter receptacle is adapted to substantially encase the ribbon cable.

41. The method of claim 38, further comprising providing at least one of the following: litter, a ramp carpet, a privacy tent, an air filter, a litter receptacle liner, a waste receptacle liner, an ionizer, or a manual litter scoop.

42. An automatic litter box, comprising:
a litter receptacle with an interior;
a drive unit comprising a motor;
a sieve slidably coupled to the motor, wherein the sieve is slidably coupled to the motor for linear movement thereto and for at least two degrees of freedom of movement relative to the litter receptacle; and
the motor adapted to transmit energy from the litter receptacle to the sieve, wherein the motor is shielded from the interior of the litter receptacle.

43. The automatic litter box of claim 42, wherein the drive unit is moveably coupled to the litter receptacle and comprises a ribbon cable affixed to the litter receptacle.

44. The automatic litter box of claim 43, wherein the motor adapted to transmit energy from the litter receptacle to the sieve comprises:
a screw drive shaft coupled to the drive unit such that the drive unit rotates the screw drive shaft; and
a threaded coupling joined to the sieve and disposed around the screw drive shaft.

45. The automatic litter box of claim 43, wherein the motor is configured to move the drive unit along the litter receptacle.

46. The automatic litter box of claim 43, wherein the sieve is further removeably coupled to the motor.

\* \* \* \* \*